United States Patent [19]
Pickett et al.

[11] Patent Number: 5,339,395
[45] Date of Patent: Aug. 16, 1994

[54] INTERFACE CIRCUIT FOR INTERFACING A PERIPHERAL DEVICE WITH A MICROPROCESSOR OPERATING IN EITHER A SYNCHRONOUS OR AN ASYNCHRONOUS MODE

[75] Inventors: James K. Pickett; Philip A. Inman; Matthew D. Sale, all of Kokomo, Ind.

[73] Assignee: Delco Electronics Corporation, Kokomo, Ind.

[21] Appl. No.: 947,126

[22] Filed: Sep. 17, 1992

[51] Int. Cl.⁵ .............................................. G06F 13/14
[52] U.S. Cl. ...................................... 395/325; 370/91; 364/232.9; 364/239.7; 364/247.4; 364/270.5; 364/271; 364/260.1; 364/DIG. 1
[58] Field of Search ............... 395/325, 275, 250, 725, 395/200, 800, 500; 370/85.11, 91, 85.1; 340/825.2, 825.14; 375/7

[56] References Cited

U.S. PATENT DOCUMENTS

| | | | |
|---|---|---|---|
| 3,970,997 | 7/1976 | Daly et al. | 395/275 |
| 3,972,023 | 7/1976 | Bodner et al. | 395/275 |
| 3,999,163 | 12/1976 | Levy et al. | 395/325 |
| 4,379,327 | 4/1983 | Tietjen et al. | 364/200 |
| 4,435,762 | 3/1984 | Milligan et al. | 395/250 |
| 4,615,017 | 9/1986 | Finlay et al. | 395/325 |
| 4,631,666 | 12/1986 | Harris et al. | 395/325 |
| 4,639,861 | 1/1987 | Appiano et al. | 395/275 |
| 4,785,469 | 11/1988 | Joshi et al. | 375/110 |
| 4,821,172 | 4/1989 | Kaneko et al. | 395/375 |
| 4,941,157 | 7/1990 | Taylor | 375/121 |
| 5,060,134 | 10/1991 | Hunninghaus | 364/200 |
| 5,060,138 | 10/1991 | Gephardt et al. | 364/200 |
| 5,060,139 | 10/1991 | Theus | 364/200 |
| 5,150,359 | 9/1992 | Wilson et al. | 370/85.11 |
| 5,208,809 | 5/1993 | Fergeson et al. | 370/91 |

*Primary Examiner*—Gopal C. Ray
*Attorney, Agent, or Firm*—Jimmy L. Funke

[57] ABSTRACT

An interface circuit is described for interfacing a peripheral device and a microprocessor to enable data transference between a memory location within the peripheral device and a data bus of the microprocessor. In accordance with the type of bus control used by the microprocessor, the interface circuit is operated in either a synchronous mode or an asynchronous mode. The interface includes a state machine that responds to the mode of interface operation, a clock signal provided by the microprocessor, requests from the microprocessor to access an addressed peripheral memory location, and a busy signal from the peripheral device indicating when the peripheral is engaged in transferring data between the interface circuit and an addressed peripheral memory location. Preferably, the interface also operates to detect error conditions based on changes in the access request during data transference between the microprocessor and the peripheral device. In response to detecting an error condition, the state machine acts to interrupt data transference to avoid the transfer of invalid data.

15 Claims, 14 Drawing Sheets

STATE TRANSITION TABLE

| LINE # | PS(2:0) | CSBS | LR/$\overline{W}$ | EQ | MODE | PENDING | NS(2:0) |
|---|---|---|---|---|---|---|---|
| STATE 0: INITIAL CONDITION ||||||||
| 1 | 000 | 1 | X | X | X | X | 000 |
| 2 | 000 | 0 | X | X | X | 1 | 000 |
| 3 | 000 | 0 | 0 | X | X | 0 | 101 |
| 4 | 000 | 0 | 1 | X | X | 0 | 011 |
| STATE 5: HIGH BYTE ACCESS ||||||||
| 5 | 101 | 1 | X | X | 0 | X | 000 |
| 6 | 101 | 0 | X | 1 | 0 | X | 010 |
| 7 | 101 | 0 | 0 | 0 | 0 | X | 101 |
| 8 | 101 | 0 | 1 | 0 | 0 | X | 011 |
| 9 | 101 | 1 | X | X | 1 | X | 100 |
| 10 | 101 | 0 | X | X | 1 | X | 101 |
| STATE 2: LOW BYTE ACCESS ||||||||
| 11 | 010 | 1 | X | X | X | X | 000 |
| 12 | 010 | 0 | X | 1 | 0 | X | 010 |
| 13 | 010 | 0 | 0 | 0 | 0 | 0 | 101 |
| 14 | 010 | 0 | 1 | 0 | 0 | 0 | 011 |
| 15 | 010 | 0 | X | X | 1 | X | 010 |
| STATE 3: DATA FETCH WAIT STATE ||||||||
| 16 | 011 | 1 | X | X | 0 | X | 011 |
| 17 | 011 | 0 | X | X | 0 | 1 | 011 |
| 18 | 011 | 0 | X | 1 | 0 | 0 | 101 |
| 19 | 011 | 0 | 0 | 0 | 0 | 0 | 101 |
| 20 | 011 | 0 | 1 | 0 | 0 | 0 | 011 |
| 21 | 011 | 0 | X | X | 1 | 1 | 011 |
| 22 | 011 | 0 | X | X | 1 | 0 | 101 |
| STATE 4: BETWEEN ACCESS WAIT STATE-ASYNCHRONOUS MODE ONLY ||||||||
| 23 | 100 | 1 | X | X | 1 | X | 100 |
| 24 | 100 | 0 | X | 1 | 1 | X | 010 |
| 25 | 100 | 0 | 0 | 0 | 1 | X | 101 |
| 26 | 100 | 0 | 1 | 0 | 1 | X | 011 |

FIG. 5

INTERFACE CIRCUIT FOR INTERFACING A PERIPHERAL DEVICE WITH A MICROPROCESSOR OPERATING IN EITHER A SYNCHRONOUS OR AN ASYNCHRONOUS MODE

BACKGROUND OF THE INVENTION

The present invention relates generally to the field of microprocessor to peripheral interfacing, and more particularly to a universal bus interface circuit for use in conjunction with a requesting microprocessor using bus control that can be either synchronous or asynchronous with respect to the microprocessor clock and a peripheral device having a clock that is not synchronized with the microprocessor clock.

Microprocessor applications requiring a host or requesting microprocessor to be interfaced with a peripheral processing device are prevalent. In such applications, the peripheral device is typically programmed to carry out input/output operations and/or data processing separately from the host microprocessor. Consequently, such a peripheral device may contain its own microprocessor, input/output circuitry, clock and control circuitry, and different addressable memory locations.

In such applications, it is not always desirable to synchronize the peripheral clock with the clock in the host microprocessor, so the peripheral clock can run at any speed relative to the microprocessor clock (either faster or slower). As a result of the difference between the peripheral and host microprocessor clocks, as well as the architecture and particular type of memory units employed in the peripheral device, the access time for different addressable memory locations within the peripheral can vary.

For a host microprocessor to access (i.e., write data to and read data from) memory locations within the above described general peripheral processing device, an interfacing circuit is required for coupling the microprocessor and peripheral address and data buses, and to provide the appropriate timing for data transfers. Since conventional microprocessors operate using either synchronous or asynchronous bus control, separate bus interfacing circuits have generally been required when interfacing a peripheral device with microprocessors that use the two types of bus control.

Consequently, there exists a need for a generic bus interface circuit for interfacing a microprocessor having either synchronous or asynchronous bus control with a processing peripheral device, where the microprocessor and peripheral can have different asynchronous clocks, and peripheral memory locations accessible to the microprocessor can have different access times.

SUMMARY OF THE INVENTION

The principal objective of the present invention to provide a bus interface circuit for interfacing a peripheral device and a microprocessor to enable the transference of data between a memory location in the peripheral device and a microprocessor data bus, where the microprocessor may utilize either synchronous or asynchronous bus control.

It is another objective of the present invention to provide a bus interface circuit that is capable of performing error detection to avoid the transference of invalid data between the peripheral device and microprocessor.

It is yet another objective of the present invention to provide a bus interface circuit that is capable of interfacing a microprocessor and a peripheral device that can operate with different asynchronous clocks running at different frequencies.

It is still another objective of the present invention to provide a bus interface circuit that can efficiently transfer data between a microprocessor and a peripheral device having memory locations with different access times.

To achieve the above objectives, there is provided according to the present invention, a bus interface circuit that can be selected to operate in either a synchronous mode, when the microprocessor utilizes synchronous bus control, or an asynchronous mode, when the microprocessor utilizes asynchronous bus control. The interface circuit operates by receiving a request from the microprocessor to access a peripheral memory location for data transference, and provides the peripheral device with an address specifying the peripheral memory location. Within the interface circuit is a data storage register, which is coupled to the peripheral device and the microprocessor data bus, to accommodate data transfers between the interface circuit and the microprocessor bus and the interface circuit and the peripheral memory location. The interface circuit also receives a clock signal from the microprocessor, and an a busy indication from the peripheral device specifying when the peripheral device is engaged in transferring data between the data storage register and the addressed peripheral memory location. In response to the interface operating mode, the request and clock signal received from the microprocessor, and the busy indication received from the peripheral device, the interface circuit operates to control the separate timing of (A) data transference between the microprocessor data bus and the data storage register, and (B) data transference between the data storage register and the peripheral memory location.

The busy indication from the peripheral device informs the interface circuit as to the exact time that data transference between the data storage register and the peripheral memory location has been completed. By utilizing this busy indication to control the timing of data transfers between the microprocessor data bus and the data storage register, the interface circuit is able to achieve efficient and rapid data transfers between the microprocessor and the peripheral device. In addition, this feature enables the interface circuit to be employed for interfacing microprocessors with peripheral devices that can have memory locations with different access times and for interfacing microprocessors and peripheral devices that can each operate with different asynchronous clocks.

According to another aspect of the invention, changes in the request for access that indicate the occurrence of an error condition are detected during data transference between the microprocessor data bus and the peripheral memory location. When such an error condition is detected, the interface circuit then interrupts data transference between microprocessor and the peripheral device to avoids the transfer of invalid data.

Preferably, the interface circuit includes a state machine for operating the interface in successive operating states, where the operating states define corresponding successive time intervals during the transference of data between the microprocessor data bus and the peripheral memory location. When the interface circuit operates in defined ones of the successive operating states, control signals are generated for separately (a) enabling data transference between the microprocessor data bus and the data storage register, and (B) initiating data transference between the peripheral memory location and the data storage register.

In the preferred embodiment, the interface circuit operates in at least one waiting state, where further requests for access by the microprocessor are disregarded while the peripheral device is engaged in the transference of data between the data storage register and the peripheral memory location. When operating in the asynchronous mode, the interface circuit also provides the microprocessor with an acknowledge signal to indicate when data transference between the microprocessor bus and the data storage register is enabled. This acknowledge signal is also preferably generated in accordance with the busy signal to indicate that data transference between the microprocessor bus and the data storage register is disabled, when the peripheral device is engaged in transferring data between the data storage register and the peripheral memory location.

These and other aspects and advantages of the invention may be best understood by reference to the following detailed description of the preferred embodiment when considered in conjunction with the accompanying drawings.

DESCRIPTION OF THE DRAWINGS

FIG. 5 is a state transition table illustrating the valid operating states generated by the state machine in FIG. 4A and conditions that induce transitions between the operating states;

DESCRIPTION OF THE PREFERRED EMBODIMENT

Figure 1:
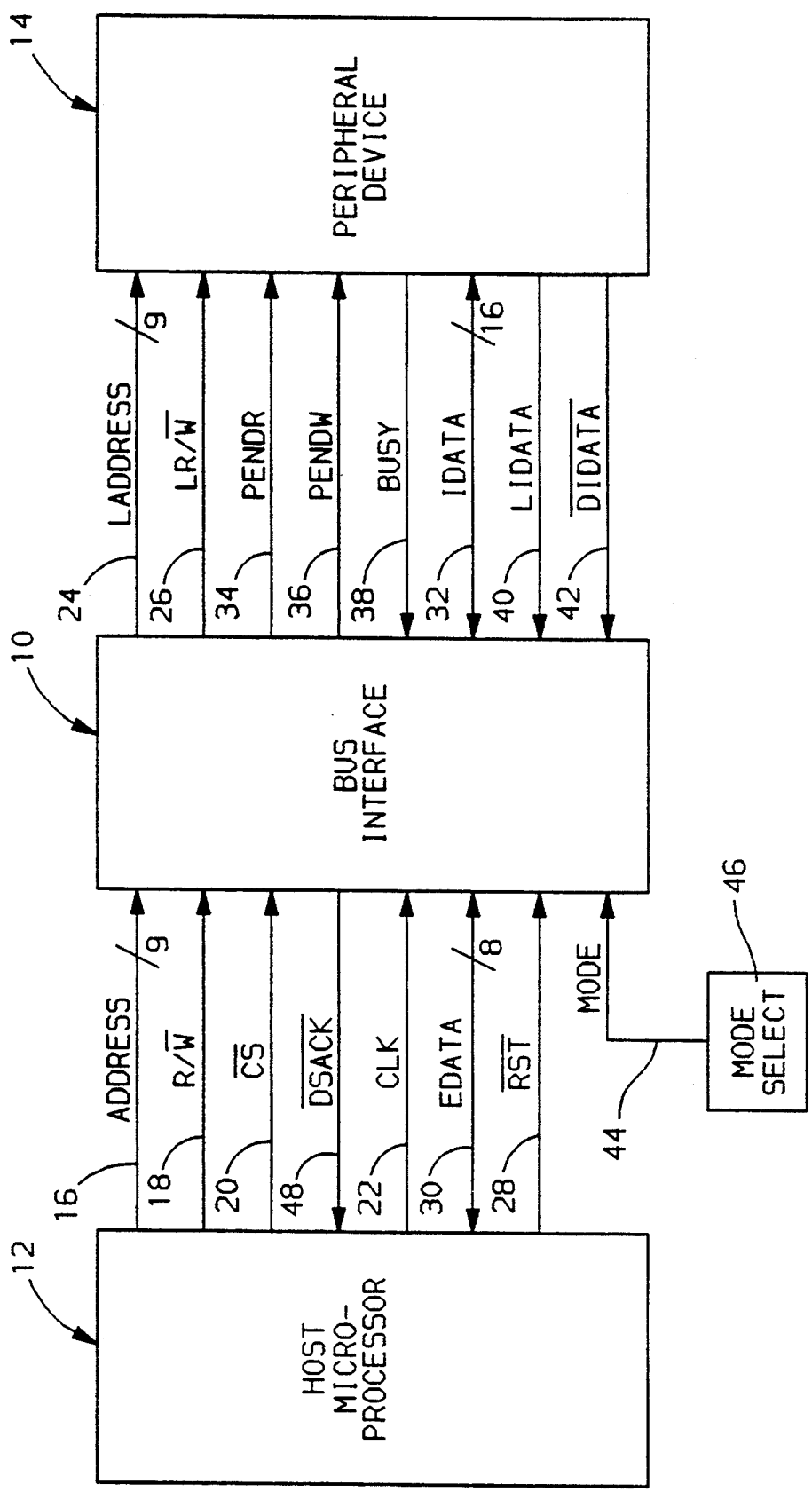
FIG. 1 illustrates schematically a bus interface circuit that operates in accordance with the principles of the present invention to enable the transfer of data between a requesting host microprocessor and accessible memory locations in a responding peripheral device.

In the description that follows, similar parts or structures used in the figures will be designated with like numerals, and where such parts and structures have been previously discussed with respect to an earlier figure, the description will not be repeated. Overscored signal names shown in the drawings will be indicated in the description by suffixing an * to the signal name. Unless stated to the contrary, an overscored signal name (or one with an * suffixed) represents the complement of that signal name and will be considered to be logically true when set or driven to a logic low value. Accordingly, signals names without the overscore (or suffixed *) will normally be understood to be logically true when set or driven to their logic high values. Where necessary to facilitating understanding, a logic high value will be referred to as having the binary value of "1" and a logic low value will be referred to as having the binary value of "0". In addition, multiple line bus structures will be drawn as single lines, each having a slash with an adjacent numeral indicating the number of bits carried by the bus (the number of individual bus lines).

Referring now to FIG. 1, there is shown schematically a bus interface circuit 10 applied to enable communication between a host or requesting microprocessor 12 and a responding peripheral device 14. For the purpose of the present description, the bus interface circuit 10 is shown as being separated from the peripheral device 14; however, it will be recognized that such bus interface circuits are commonly incorporated directly into the peripheral device being interfaced.

In some cases, peripheral device 14 will be carrying on input/output operations and/or data processing separately from the host microprocessor, and in these cases, the peripheral device 14 may contain its own microprocessor, input/output circuitry, separate clock and control circuitry, and different addressable memory units, such as storage registers, and/or random access memory. Depending upon the architecture of the peripheral device 14 and the particular type of memory units used, it is also common for different addressable locations within the peripheral device to require different amounts of time to complete a read and/or a write access.

In general, the peripheral clock may not be synchronized with the clock in the host microprocessor 12, and can be operating either faster or slower than the host microprocessor clock. When operating in accordance with the present invention, bus interface circuit 10 enables the requesting or host microprocessor 12 to read and write data to and from different addressable memory locations in the peripheral 14, with the host microprocessor having either synchronous or asynchronous bus control.

For example, the present invention can be used to interface a peripheral device with a microprocessor such one from the Motorola 6800 family that operates with synchronous bus control, or with one from the Motorola 68000 family that can operate with either synchronous or asynchronous bus control. Consequently, one of the principal advantages of the present invention is its versatility, in that a single bus interface circuit can be employed to interface a peripheral with microprocessors that use either type of bus control without the need for additional hardware.

Referring again to FIG. 1, a general description of the various input and output signals entering and exiting the bus interface circuit 10 and their functional relationship with the host microprocessor 12 and peripheral device 14 will now be described.

When host microprocessor 12 desires to access a particular memory location within peripheral device 14, the host microprocessor 12 places the address of that peripheral memory location on the address bus 16. In the preferred embodiment the requested address takes the form of a 9 bit signal denoted as ADDRESS, which is directed as an input signal to the bus interface circuit 10. It will be understood that the number of bits carried by address bus 16 may differ for different applications, and the 9 bit address bus size used by the preferred embodiment should not be considered as limiting the scope of the present invention.

When the host microprocessor 12 desires to read data from the requested memory location in peripheral device 14, it drives the R/W* signal on the bus interface input line 18 to a logic high value. When the host microprocessor 12 desires to write data to the addressed memory location, it drives the R/W* signal to a low logic value.

The CS* signal on input line 20, commonly known as a chip select signal, is driven to a logic low value by host microprocessor 12 to indicate that the ADDRESS signal on bus 16 and the R/W* signal on line 18 are intended for use by bus interface circuit 10, and hence, peripheral device 14. It will be understood that the host microprocessor 12 may be connected to other bus interface circuits and peripheral devices (not shown) that would have their own individual chip select signals. Such chip select signals are typically derivable as partial decodes of the ADDRESS signal placed on address bus 16.

The CLK signal on line 22 represents the sequentially pulsed clock signal of host microprocessor 12, which is input to the bus interface circuit 10 for timing and synchronization purposes. As will be described at a later point in the specification, input signals such as ADDRESS, R/W*, and CS* are latched into storage locations within bus interface circuit 10 in synchronism with clock signal CLK provided by the host microprocessor 12. The latched values for ADDRESS and R/W* are represented respectively by the LADDRESS and LR/W* signals and pass from bus interface circuit 10 via the 9 bit latched address bus 24 and line 26 to the peripheral device 14 to indicate which memory location is being accessed, and whether a read or a write access will be occurring at the memory address indicated by LADDRESS.

It will be understood that the chip select signal CS*, read/write signal R/W*, and ADDRESS signal constitute the actual request from the microprocessor 12 for access to the specified peripheral memory location.

The RST* signal input to the interface circuit 10 over line 28 provides the host microprocessor 12 with the ability to reset or initialize latches, flip-flops, and registers within the bus interface 10, by driving RST* to its logic low value.

In the preferred embodiment of the invention shown in FIG. 1, data transfer between the interface circuit 10 and the host microprocessor 12 takes place on an external data bus 30 in the form of an 8 bit data signal denoted as EDATA. External data bus 30 connects directly to the external data bus of microprocessor 12. Data transfer between interface 10 and addressable memory in peripheral 14 take place via the internal data bus 32 in the form of a 16 bit data signal denoted as IDATA. It will be understood that the external and internal data bus structures, 30 and 32 respectively, can have bit sizes different from those illustrated in the preferred embodiment of the invention in FIG. 1. As will be described subsequently, the sizing of the data bus structures can be changed, depending upon the requirements of the particular interfacing application, and should not be taken as limiting the scope of the present invention.

In addition to the signals already mentioned, interface circuit 10 sends two additional signals to peripheral 14, namely, PENDR and PENDW on lines 34 and 36 respectively. PENDR indicates to peripheral 14 that an interface read access to peripheral memory is pending, and that bus interface 10 is ready to receive data via the internal data bus 32 from the addressed peripheral memory location indicated by LADDRESS. Conversely, PENDW indicates that an interface write access to peripheral memory is pending, and that bus interface 10 is ready to write data via internal data bus 32 to the addressed peripheral memory location indicated by LADDRESS.

In response to the PENDR or PENDW signal being set to a logic high value), peripheral device 14 operates to immediately drive a BUSY signal on line 38 to a logic high value. This BUSY signal provides interface 10 with an indication that the peripheral device is engaged in transferring data between the interface 10 and the peripheral memory location. As soon as the access to peripheral memory is complete, peripheral 14 operates to drive the BUSY signal to a logic low value.

Thus, the PENDR and PENDW signals initiate respectively read and write transfers of data between the interface 10 and the peripheral memory location. Those skilled in the art will recognize that peripheral device 14 could determined whether the request from the microprocessor was for a read access or write access, based upon receiving one of the PENDR or PENDW signals, in which case the latched read/write signal LR/W* provided by the interface 10 to the peripheral device 14 would not be necessary.

Those skilled in the art will also recognize that the BUSY signal can be derived from individual busy signals conventionally provided by different peripheral memory units in accordance with their individually required access times, by simply passing all of the individual memory unit busy signals through an OR gate to generate the peripheral output BUSY signal. As a result, the generic BUSY signal will undergo a logic high to low transition (in synchronism with the peripheral clock), as soon as the memory access for the particular addressed location is complete. As will become apparent from the description that follows, the present invention utilizes this BUSY signal, which is related to the actual time required to access a particular addressed memory location or the readiness of the data, to minimize the time required for the transmission of data between the host microprocessor 12 and the peripheral device 14.

Peripheral device 14 provides the interface circuit 10 with two additional signals LIDATA and DIDATA* on input lines 40 and 42, respectively. As will be described, bus interface circuit 10 latches IDATA from the internal bus 32 and stores it in an internal register in response to the driving high of LIDATA, and drives data from the internal storage register onto the internal data bus 32 in the form of IDATA in response to DIDATA* being driven low by peripheral 14. Since the LIDATA and DIDATA* will act in synchronism with the peripheral clock, these two signals provide the appropriate timing to effectuate valid and rapid transfers of data between the bus interface circuit 10 and the peripheral device 14, each of which are operating at different clock speeds, in the general application.

In addition to the above described input and output signals, bus interface circuit 10 is provided with an input MODE signal on line 44 from a mode select block designated by the numeral 46. The MODE signal is used to inform interface circuit 10 as to which type of bus control the host microprocessor 12 is using. In the preferred embodiment, MODE is set to a logic high value to indicate that host microprocessor 12 is operating with asynchronous bus control. MODE is set to a logic low value to indicate that synchronous bus control is being used. Once the desired mode of host bus control is known, the MODE signal can be set to the appropriate value by switching or connecting line 44 to the appropriate logic high or low voltage potential assumed to be present in mode select block 46. Of course, if the type of bus control to be used were known apriori, the MODE signal could be set to the appropriate logic voltage level inside the bus interface 10.

When the host microprocessor 12 operates using asynchronous bus control (MODE=1), a DSACK* signal is generated by the bus interface 10 and directed to the host microprocessor over line 48. The DSACK* signal, sometimes known as a handshake or data strobe acknowledge signal, is initially at a logic high value at when the host requests a read or write access, and is then set or driven to a logic low value to notify host microprocessor that the bus interface 10 has driven data onto the external data bus 30 (during a host requested read access) or latched data from the external data bus 30 (during a host requested write access).

Figure 2:
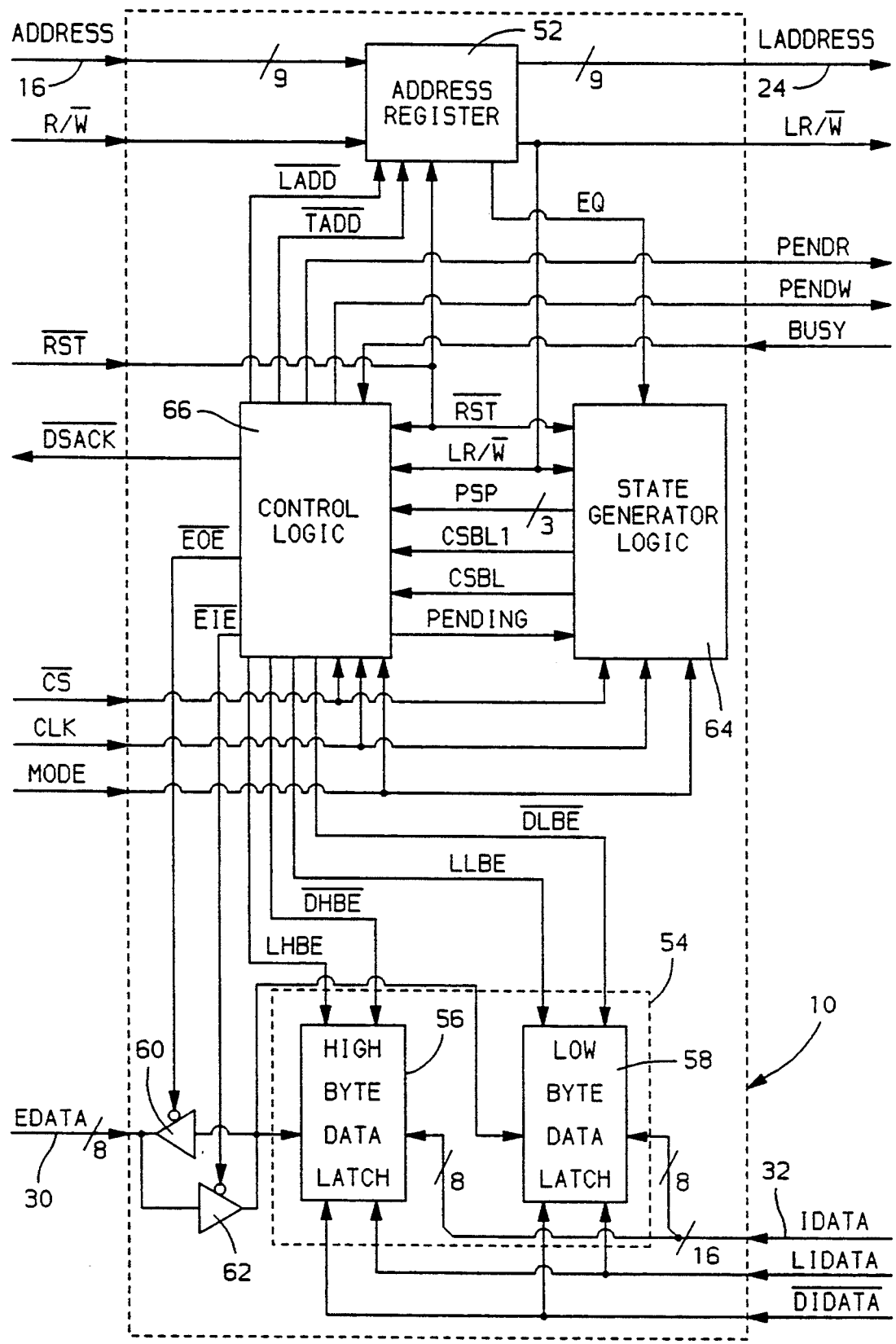
FIG. 2 is a high level block diagram showing the principle components of the bus interface circuit of FIG. 1.

Referring now to FIG. 2, there is shown a high level block diagram illustrating the interconnection of the primary functional components within the bus interface circuit 10 presented in FIG. 1. These components include: (1) a special purpose address register 52 for latching the 9 bit ADDRESS and R/W* signals from host microprocessor 12 and providing the latched LADDRESS and LR/W* signals to peripheral device 14; (2) a data storage register 54, which in the preferred embodiment is a standard bi-directional register containing a high byte data latch 56 and a low byte data latch 58 for latching and driving data from and to the 8 bit external data bus 30 and the 16 bit internal data bus 32; (3) bus drivers 60 and 62 for enabling the transfer of data between the external data bus 30 and the data register 54; (4) state generator logic 64, which generates a sequence of interface operating states in response to the clock signal CLK and the other indicated input signals; and (5) control logic contained in block 66, which generates output signals to appropriately control the operation of the bus interface 10 during each interface operating state generated by the state generator logic 64.

Briefly, a 3 bit state control signal, denoted as PSP, is provided by the state generator logic 64 to the control logic block 66. The present state control signal PSP represents the present operating state of the bus interface 10. Based upon the present operating state and the inputs LR/W*, MODE, CS*, EQ (provided by address register 52), and PENDING (from control logic 66), the state generator logic 64 generates a signal representing the next interface operating state, which then becomes the new present operating state for the bus interface 10 in response to the next clock pulse provided by the CLK signal. As will later be described, the PENDING signal provided to state generator 64 by control logic 66 is dependent upon the BUSY signal generated by peripheral device 14.

During normal operation, the state generator 64 moves the operation of the bus interface 10 through a sequence of operating states in response to the type of bus control used by the host microprocessor (MODE), the type of data access (R/W*) requested by the host microprocessor with the chip select signal (CS*) for an addressed memory location (ADDRESS) in the peripheral device 14, the clock signal (CLK) provided by the host microprocessor, and the time required to complete the access at the addressed peripheral memory location (as indicated by the BUSY signal). The control logic 66 then generates the appropriate signals at times defined by the different interface operating states to effectuate rapid and valid data transfers between the host microprocessor 12, the bus interface 10, and the peripheral device 14.

For example, the control logic 66 generates the signals EOE* and EIE* which are respectively directed to the bus drivers 60 and 62. When EOE* is driven low, driver 60 is enabled to drive the external bus 30 so that data can be transferred to the host microprocessor 12 from the interface data register 54. Likewise, when EIE* is driven low, bus driver 62 is enabled to permit the transfer of data from the host microprocessor 12 over the external bus 30 to the interface data register 54.

Additional interface control signals generated by the control logic 66 include the signals LADD* and TADD*, which are directed to address register 52. When LADD* is driven low, the 9 bits of the ADDRESS signal and the status of the R/W* signal are respectively latched as values for the LADDRESS and LR/W* signals in a latch register within address resister 52. When TADD* is driven low by the control logic 66, the latched LADDRESS and LR/W* signals are stored in a second transfer register within the address register 52. The operation of the special purpose address register 52 will be described later in the discussion related to FIG. 3.

The signals LHBE, DHBE*, LLBE, and DLBE* generated by the control logic 66 are used to control and enable data transference between the 8 bit external data bus 30 and the two bi-directional data latches 56 and 58 within data register 54. By definition, the first 8 bits of EDATA (hereinafter referred to as the HIGH byte) transferred either to or from the host microprocessor 12 on external bus 30 will be associated with the high byte data latch 56. The second 8 bits EDATA (hereinafter referred to as the LOW byte) transferred on bus 30 will always be associated with the low byte data latch 58. Control logic 66 drives the LHBE signal high to latch the first or HIGH byte of data on bus 30 into data latch 56, and drives the LLBE signal high to latch the second or LOW byte of data placed on bus 30 into data latch 58. Likewise, when data is to be driven onto the external data bus 30, the control logic first drives the DHBE* signal low to enable an external bus output driver within the high byte data latch 56, and then, at the appropriate time, DLBE* is driven low to enable the corresponding external bus output driver within the low byte data latch 58.

It should also be noted that in addition to the above described internal interface control signals, control logic 66 generates the bus interface output signals PENDR and PENDW that are directed to peripheral device 14, and it receives the BUSY signal generated by the peripheral device 14.

As mentioned previously, the transfer of data on the 16 bit internal data bus 32 between interface 10 and peripheral 14 is controlled by the LIDATA and DIDATA* signals, which are provided by the peripheral 14. As shown in FIG. 2, the 16 bit internal data bus carrying IDATA is split into two portions with the lines associated with the lower 8 bits connected to the low byte data latch 58 and the lines associated with the upper 8 bits connected to the high byte data latch 56. The LIDATA and DIDATA* signals are then directed to both data latches 56 and 58. When LIDATA is driven high by peripheral 14, then the upper 8 bits of IDATA (the HIGH byte) are latched into the high byte data latch 56 and the lower 8 bits of IDATA (the LOW byte) are latched into the low byte data latch 58. Likewise, the DIDATA* signal provided by peripheral 14 is directed to the internal bus output driver in each of the data latches 56 and 58, so that when the DIDATA* signal is driven low, the HIGH and LOW bytes of data are driven respectively onto the upper and lower 8 bit lines of internal bus 32.

Figure 3:
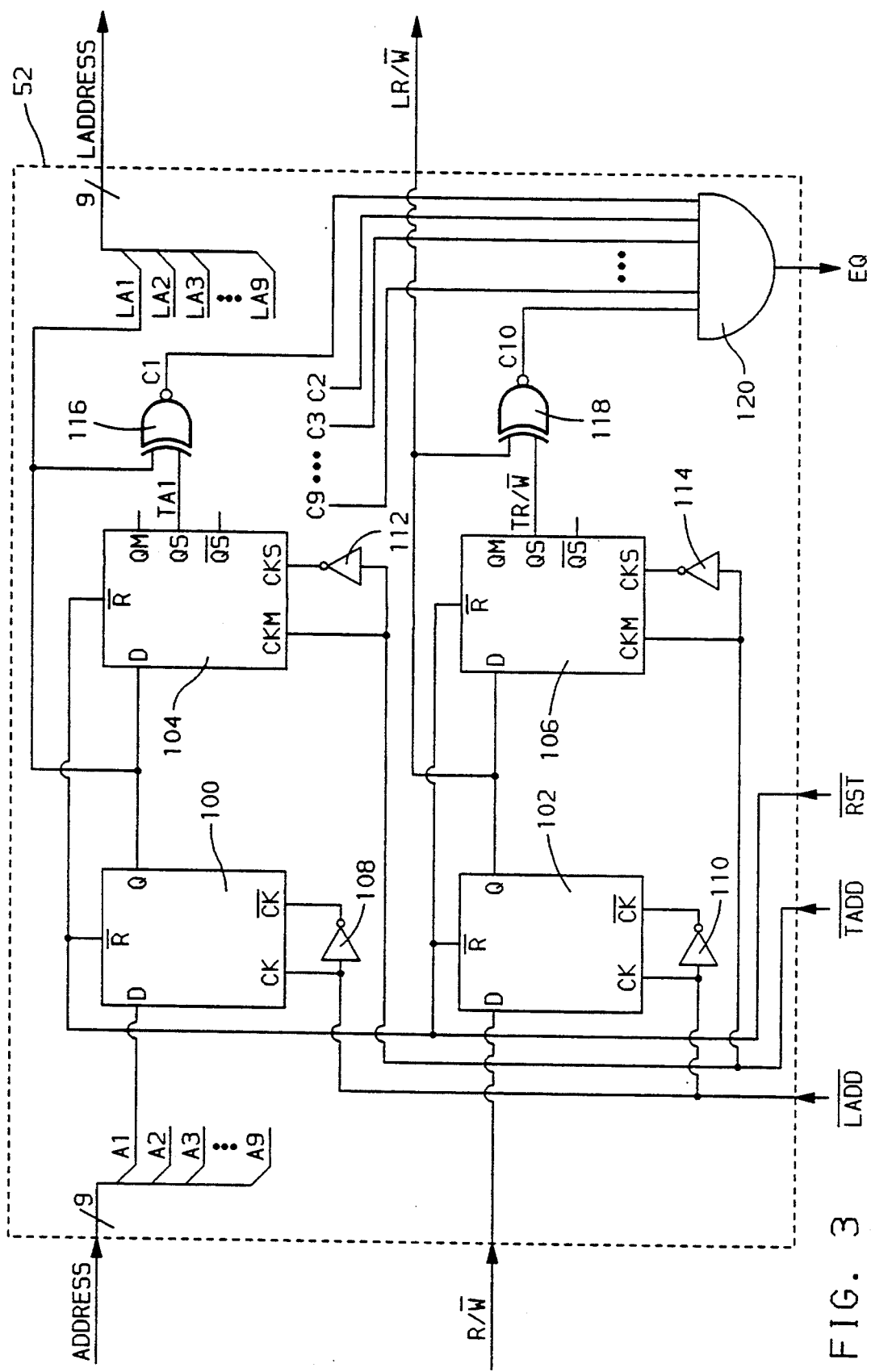
FIG. 3 is a logic diagram illustrating components used in implementing the address register in the preferred embodiment of the invention of FIG. 1.

Turning now to FIG. 3, there is illustrated a portion of the logic used in implementing the address register 52 shown originally in FIG. 2. As indicated, the signals A1-A9 and LA1-LA9 represent the individual bits of the 9 bit ADDRESS and LADDRESS signals respectively, with A9 and LA9 representing the most significant bits (MSB) of the address. Note that the least significant bits (LSB) of the ADDRESS and LADDRESS signals (which would be represented as A0 and LA0, respectively) are not shown as being included in the address signals. Since the established convention in the preferred embodiment of the bus interface is to always transfer the high byte of a two-byte data word first, followed by the low byte, the least significant bits in address signals are not required in applications where the microprocessors are using the conventional odd-/even addressing scheme (i.e., where the LSB of an address is used only to distinguish between the high and low bytes of a data word).

To conserve space, only the logic circuitry associated with the A1 and LA1 bits of the ADDRESS and LADDRESS signals, and similar logic for the R/W* and LR/W* signals is shown. The circuitry used for each of the other higher order bits in the ADDRESS and LADDRESS signals will be identical with that shown for the A1 and LA1 bits.

Latches 100 and 102 are standard bistable (transparent) latches, well known to those skilled in the art. Each latch 100 and 102 has a D input, and R* reset input, clock inputs CK and its inverse CK* (typically used in CMOS logic), and a Q output. A logic high signal applied to clock input CK (with a logic low applied to CK*) enables the Q output to assume the logic value of the signal applied at the D input (i.e., the latch becomes transparent between its D input and Q output). The value of the signal at the Q output is then latched on the falling edge of the signal applied to the CK input (i.e., on the high to low transition).

The flip-flops designated by the numerals 104 and 106 are standard D type master-slave flip-flops, each including a D input, a master output QM, a slave output QS, a slave inverse output QS* (the inverse of the QS output), a reset input R*, a master clock input CKM, and a slave clock input CKS. Each master-slave flip-flop can be thought of as containing two transparent type latches, such as 100 or 102, one designated as the master and the other designated as the slave. In the master-slave configuration, output of the master latch QM is coupled to the D input of the slave latch. The logic value of a signal applied to D input of the flip-flop (which is the master latch input), is passed to the master output QM, when the signal applied to the CKM input is high, and is latched at the QM output on the falling edge of the signal applied to the CKM input. Likewise, the logic level of the signal applied to the input of the slave latch, which is the signal at QM, is passed to the slave output QS, when the CKS slave clock input is high, and is latched at the QS output on the falling edge of the signal applied to the CKS input. When inverse signals are applied to the CKM and CKS clock inputs of the flip-flops, as indicated in FIG. 3, a signal applied to the D input will appear at the QM output when the CKM input is high, and at the QS output when CKM is low. The logic level at the QM output is latched on the falling edge of the signal applied to the CKM input. This logic level at the QM output then appears at the slave QS output when the CKM signal is low (CKS high). It is also customary to refer to the QS output as being latched on the falling edge of the CKM signal (rising edge of CKS), since the signal at QS follows the signal at QM, and QM is latched on the falling edge of the CKM signal.

The reset signal RST* is applied to the reset R* input of latches 100 and 102, and flip-flops 104 and 106 within address register 52. Note that when RST* is driven low, the Q outputs of latches 100 and 102 and the QM and QS outputs of flip-flops 104 and 106 are all set to logic low values.

Although the QM and QS* outputs of flip-flops 104 and 106 are not used when implementing address register 52, they have been shown and described to define the nomenclature that will be used, when referring to latches and flip-flops through the remainder of the specification. Also, the connection of the reset signal RST* to the R* input of latches and flip-flops will be shown in the figures that follow, but the resetting action will not be further discussed, since it operates in the same fashion as described above.

The operation of the special purpose address register 52 used in the preferred embodiment of the invention will now be described. The latch address signal LADD* input to address register 52 is applied to the CK clock inputs of latches 100 and 102, which have their D inputs connected to the A1 and R/W* signals respectively. The appropriate inverted CK* inputs for the flip-flops 100 and 102 are derived by passing the LADD* signal through the respective inverters 108 and 110. When the signal LADD* is driven low, the logic states of A1 and R/W* will be latched at the Q outputs of respective latches 100 and 102. As indicated, these are the latched values for LA1, the first bit of the latched address output LADDRESS, and for LR/W*, the latched value of the R/W* signal. As discussed previously, similar latches and circuitry exist within address register 52 for latching the other address bits A2-A9, but it has not been shown to conserve space. The latches 100 and 102, along with those not specifically shown for latching bits A2-A9, form what will be hereinafter referred to as the latched address register within the special purpose address register 52.

The transfer address input signal TADD* to address register 52 is applied to the CKM master clock inputs of flip-flops 104 and 106. TADD* is also inverted by the action of inverters 112 and 114 and then applied to the CKS slave clock inputs of the same flip-flops 104 and 106. When TADD* is driven low, the values of the latched address bit LA1 and latched LR/W* signals pass to the QS outputs of flip-flops 104 and 106, respectively, and are latched. As a consequence, the current values of the latched address bit LA1 and latched LR/W* signals are transferred and latched at the respective QS outputs of flip-flops 104 and 106 as TA1, the transferred latched address bit LA1, and TR/W*, the transferred latched LR/W* signal. Similarly, the value of the other latched address bits LA2-LA9 are transferred and latched by flip-flops and circuitry within address register 52 that has not been shown to conserve space. These flip-flops form what will hereinafter be referred to as the transferred address register, which holds the values of the bits TA1-TA9 of the transferred address signal denoted as TADDRESS.

The EQ output signal generated by address register 52 is obtained as follows. The latched address value LA1 and transferred latched address value TA1 are input to an exclusive NOR gate 116 to produce output C1. Note that C1 will have a logic high value only when the value of LA1 equals TA1 (i.e. both are either logic high or low). Similarly, all other latched and transferred latched address bits are compared by exclusive NOR gates (not shown) to produce signals the C2, C3, ..., and C9, and the signals LR/W* and TR/W* are compared by exclusive NOR gate 118 to produce the signal C10. These comparison signals C1-C10 are all input to AND gate 120, which produces the final EQ output signal for address register 52. From the above, it will be understood that EQ will have a logic high value only when the latched LR/W* signal has the same value as the transferred value TR/W*, and each bit in the latched address LADDRESS (LA1-LA9) has the same value as the corresponding bit in the transferred latched address (TA1-TA9).

Figure 4A:
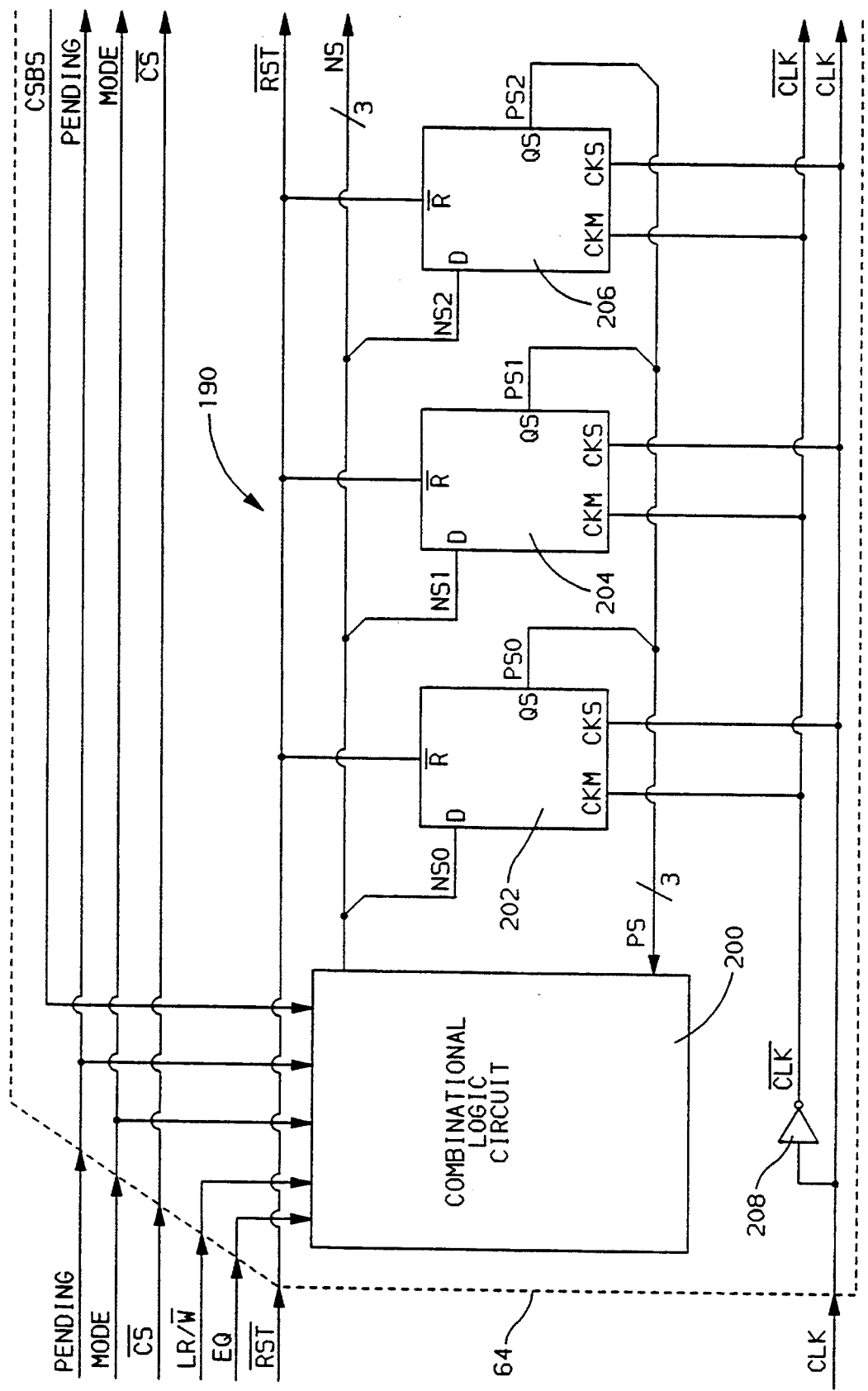
FIGS. 4A and 4B show a schematic, partially in block diagram form and partially in logic diagram form, illustrating components within the state generator logic block of FIG. 2.
Figure 4B:
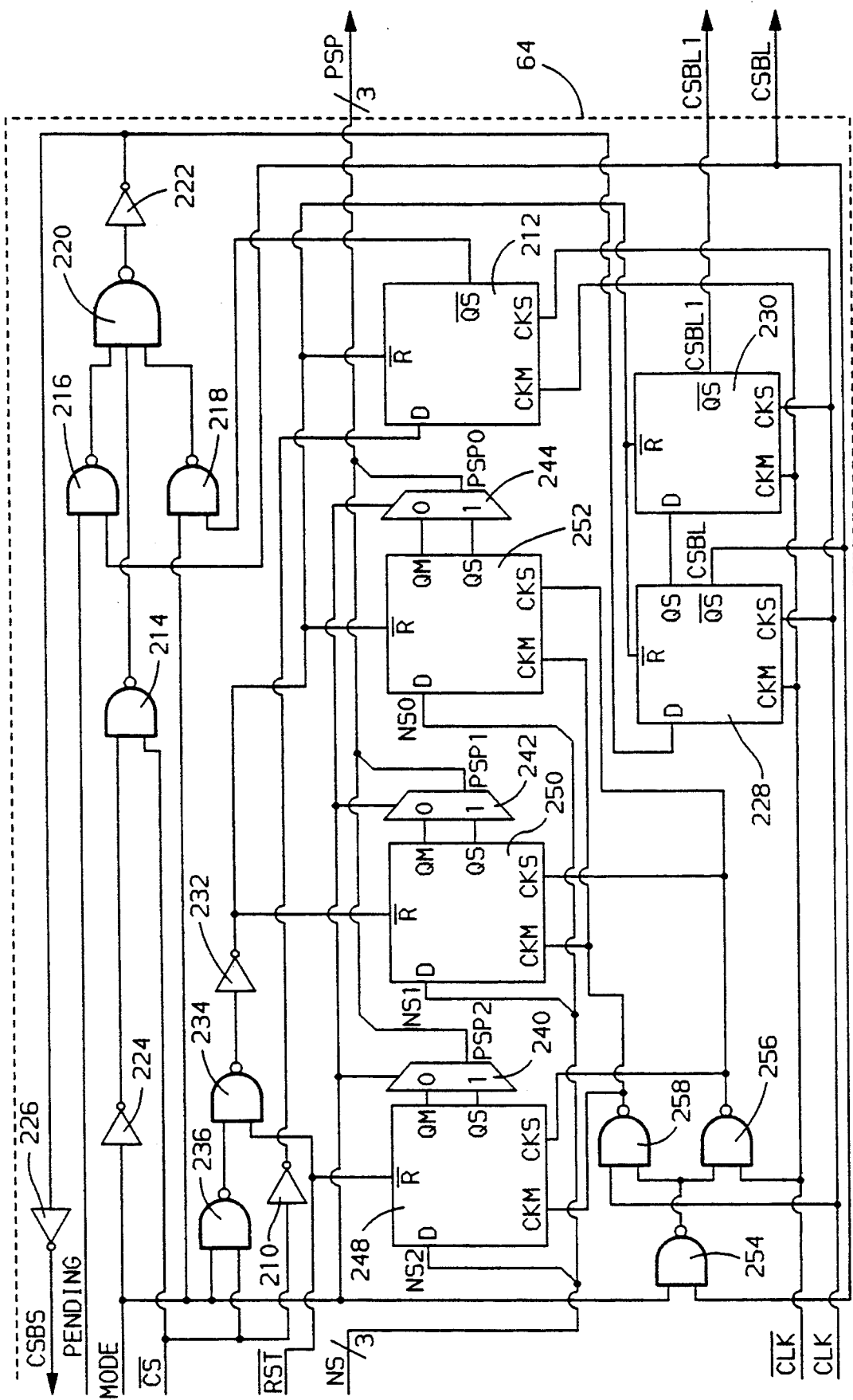

Referring now to FIGS. 4A and 4B, there is shown a schematic, partially in block diagram form and partially in logic diagram form, illustrating components within the state generator logic 64 of FIG. 2. As mentioned previously, the principal function of the state generator logic 64 is to move the operation of the bus interface 10 through a sequence of operating states based upon inputs provided by the host microprocessor 12 and the peripheral device 14 to ensure rapid and valid data transfers between these units. To achieve this, state generator 64 generates a present state control signal PSP containing 3 bits, i.e. PSP2, PSP1, and PSP0 (in the order of MSB to LSB), the values of which determine the current operating state of the bus interface 10.

For the embodiment of the invention illustrated in FIG. 2, the bus interface 10 has five valid and defined operating states designated as state 0, state 2, state 3, state 4, and state 5, which correspond respectively to the decimal values associated with binary number represented by the three bits of the PSP signal, i.e., 000, 010, 011, and 100, and 101.

The principal components of that portion of the state generator 64 shown in FIG. 4A are the combinational logic circuit 200 and the three D type master-slave flip-flops 202, 204, and 206, which are clocked by CLK (and CLK* as derived from the output of inverter 208). The combinational logic circuit generates a signal next state signal NS having three bits NS2, NS1, and NS0, the values of which indicate next valid operating state that the bus interface 10 will move into from its present operating state. The values of the NS2, NS1 and NS0 bits (in the order of MSB to LSB) are latched by the respective flip-flops 206, 204, and 202 at their QS outputs on the rising edge of each CLK clock signal, and are denoted respectively as the three bits PS2, PS1, and PS0 of a present state signal PS. The three bits of the present state signal PS act as inputs for the combinational logic circuit 200. As will be later shown, the state control signal PSP (3 bits) generated by that portion of the circuitry shown in FIG. 4B, and the PS signal (3 bits), both represent the present operating state of the bus interface 10, but with slightly different timings to assure the proper performance of bus interface 10, when the host microprocessor clock (CLK) operates at high speeds.

The combinational logic circuit 200 generates values for the 3 binary bits of NS representing the next operating state for the interface circuit 10, based upon the values of the indicated input signals CSBS, PENDING, MODE, LR/W*, EQ, and the current values of the three latched bits PS2, PS1, and PS0 of the input PS signal. The clocked flip-flops 202, 204, and 206, along with the combinational logic circuit 200 form what is known in the art as a state machine, which is generally designated by the numeral 190. Due to space limitations and the large number of logic gates that are required, a specific logic diagram for combinational logic circuit 200 will not be given. Instead, a state transition table is provided in FIG. 5, which defines the operation of the entire state machine 190. As will be understood by those skilled in the art, it is quite a routine matter to design specific logic for implementing combinational logic circuit 200 based upon the state transition table provided in FIG. 5, since it defines the value of outputs (the NS2, NS1, and NS0 bits) in terms of the inputs (CSBS, PENDING, MODE, LR/W*, EQ, and the bits PS2, PS1, and PS0). In fact, such designs are commonly carried out using logic synthesis computer aided design software such as "Finesse", copyrighted and marketed by Cascade Design Automation, Inc. The specific details of the state transition table of FIG. 5 will be discussed at a later point in the specification.

Referring now to FIG. 4B, the remainder of the logic circuitry within the state generator 64 will be discussed. The logic circuitry of FIG. 4B generates a signal denoted as CSBS, which is used as an input to the state machine 190 shown in FIG. 4A. When the bus interface operates in the asynchronous mode (MODE=1), the CSBS signal represents a synchronized version of the chip select signal CS*, which is conditioned by the host clock CLK. The CS* signal is applied through inverter 210 to the D input of flip-flop 212. When CS* is driven to its logic low value (thereby indicating that the peripheral has been selected for a data access operation), the QS* output of flip-flop 212 responds by switching from a logic high to low value, upon the occurrence of the first rising edge of the CLK signal after CS* has been driven low. Due to the action of NAND gates 214, 216, 218, and 220, and inverters 222, 224, and 226, the CSBS signal tracks the high to low transition of the QS* output of flip-flop 212, during operation in the asynchronous mode. The PENDING signal is used as an input to gate 216 to prevent the driving low of CSBS if any access is pending, which is indicated when PENDING has a logic high value.

The output of inverter 222, which represents the inverted value of CSBS is applied to the D input of flip-flop 228, which in turn has its QS output applied to the D input of flip-flop 230. The CSBL output signal produced at the QS* output of flip-flop 228 and the CSBL1 output signal produced at the QS* output of flip-flop 230 then represent time delayed versions of the CSBS signal, with their logic low transitions being delayed by one and two clock (CLK) periods, respectively, after CSBS is driven low.

When the interface 10 is operated in the synchronous mode (MODE=0), CSBS follows the CS* signal dynamically, with the logic high to low transitions of CSBL and CSBL1 being respectively delayed until the first and second rising edges of the CLK signal that occur after CS* is driven low.

When interface 10 is operated in the asynchronous mode (MODE=1), all of the signals CSBS, CSBL, and CSBL1 are driven high at the same time, on the rising edge of CS*. This results due to the action of inverter 232 and NAND gates 236 and 234 in driving low the signal applied to the reset inputs R* of flip-flops 212, 228, and 230.

The output state control signal PSP from state generator logic 64 is produced differently depending upon the logic value of the MODE signal. As indicated, the bits NS2, NS1, and NS0 of the next state signal NS produced by that portion of the circuit shown in FIG. 4A are applied to the respective D inputs of flip-flops 248, 250, and 252. The bits PSP2, PSP1, and PSP0 of the PSP signal are derived from the outputs of the multiplexers 240, 242, and 244, which in turn have their 0 and 1 inputs connected to the QM and QS outputs of respective flip-flops 248, 250, and 252. The MODE signal is applied to the input select line of each multiplexer, and as a result, when the interface 10 is operated in the synchronous mode (MODE=0), the QM outputs of flip-flops 248, 250, and 252 pass through the 0 input of multiplexers 240, 242, and 244, to produce the values for respective bits PSP2, PSP1, and PSP0 of the PSP signal. Conversely, when interface 10 is operated in the asynchronous mode (MODE=1), the QS outputs of flip-flops 248, 250, and 252 pass through the 1 input of multiplexers 240, 242, and 244 to produce the bits of the PSP signal.

It will also be recognized that the master and slave clock inputs CKM and CKS to flip-flops 248, 250, and 252 depend upon the value of the MODE signal. In the synchronous mode (MODE=0), the CKM inputs are essentially clocked by the inverse of CLK produced at the output of NAND gate 258, while the CKS clock inputs are clocked by the inverse of CLK* produced at the output of NAND gate 256.

In the asynchronous mode (MODE=1), NAND gates 254, 256, and 258 hold the CKM and CKS clock inputs to flip-flops 248, 250, and 252 at their logic high values, until CSBL is driven low in response to the chip select signal CS* going low. As a consequence, the bit values of the NS signal that are applied to the respective inputs of flip-flops 248, 250 and 252 pass directly to their corresponding QS outputs, and through the multiplexers 240, 242 and 244 to become the bit values for the PSP signal. Once CSBL is driven low, clock signals CLK and CLK* pass through gates 258 and 256 to clock flip-flops 248, 250, and 252.

In addition to acting as a reset signal for flip-flops 212, 228, and 230, the output signal from inverter 232 is also applied to the reset inputs R* of flip-flops 250 and 252. As a result, these two flip-flops are reset, whenever CS* goes high, when the interface is operating in the asynchronous mode (MODE=1). This resetting of flip-flops 250 and 252 also resets the two least significant bits of the PSP signal to 0 values, whenever CS* goes high in the asynchronous mode. Thus, the two least significant bits of the present state control signal PSP are reset asynchronously (independent of the CLK signal) on the rising edge of the chip select signal CS*, when the interface is operated in the asynchronous mode. This is done to assure that interface 10 moves immediately from operating state 5 (binary 101) to state 4 (binary 100), and from state 2 (binary 010) to state 0 (binary 000), whenever CS* goes high during asynchronous operation. It has been found that without this automatic resetting of the two least significant bits of PSP, operating state 4 can be erroneously skipped, due to delays in the logic of combinational logic circuit 200 and the very short times that the chip select signal CS* can be at a logic high value in the asynchronous mode. The resetting of the two least significant bits of PSP also asynchronously moves interface from operating state 2 to operating state 0. This is done to enable the interface to accommodate short between-access times common with high speed asynchronous host microprocessors.

From the foregoing, it will be understood, that the bit values of the present state control signal PSP output by the state generator 64 will have values the same as the bit values of the present state signal PS used as an input by combinational logic circuit 200, but at different times with respect to the CLK to assure that the state generator 64 moves the interface circuit 10 through the proper sequence of operating states (i.e., from the present state defined by the bits of the PS signal to the next state defined by the bits of the NS signal).

As stated previously, the state transition table provided in FIG. 5, defines the valid operating states generated by state machine 190 and the conditions that necessitate waiting in a particular operating state and conditions that induce transitions between between different operating states. The state transition table also provides for the detection of certain error conditions that can occur in the during data access requests when the host microprocessor fails to observe the proper protocol, and error avoidance transitions that interrupt data transfers to avoid transferring potentially corrupt data. The general nature of these error conditions is briefly described below, to facilitate the understanding of the discussion related to the state transition table that immediately follows.

Recall from the discussion related to FIG. 1, that data transfers between the preferred embodiment of the interface circuit 10 and peripheral 14 take the form of 16-bit data transfers on the internal data bus 32, while data transfers between the interface circuit 10 and the host microprocessor 12 take the form of 8-bit data transfers on the external data bus 30. Consequently, when sending data between the host microprocessor 12 and the peripheral device 14, 16-bit data must be transferred through an 8-bit port. This is accomplished by having each host microprocessor access consist of two 8-bit transfers, hereinafter referred to as a double-byte access, where the HIGH byte is always transferred first, followed by the transfer of the LOW byte.

During normal operation, the bus interface waits until both bytes have been transferred before beginning a new access. However, errors can occur during a requested access, and state machine 190, through its combinational logic circuit 200, possesses the capability of detecting different error conditions, and interrupting the transfer of data to avoid the transmission of potentially corrupt data.

In general, the state machine 190 checks for protocol correctness in the following manner. If the address or the state of R/W* changes between the high byte access and the low byte access, the state machine 190 assumes that the high byte access was in error, and treats the low byte access as the high byte access for the new address or the new type of access. Also for a synchronous read access, if the address or the state of the R/W* signal changes during the time between the initial access request and the high byte access, the bus interface 10 assumes that the initial access was in error and will begin a new access. Additionally, during synchronous accesses, if the host microprocessor 12 violates between-access delay timing, the bus interface 10 ignores the newly-requested access; however, when the host microprocessor 12 violates between-access delay timing during asynchronous accesses, the bus interface waits to drive the DSACK* (data strobe acknowledge) signal, until the newly requested access can be accommodated.

Turning to FIG. 5, the state transition table for state machine 190, along with the error detection and avoidance conditions, will now be described with reference to each line number under the Line # column heading in the table. Also note that the table column headings PS(2:0) and NS(2:0) refer respectively to the binary values of the PS2, PS1, and PS0 bits (MSB to LSB) of the present state signal PS, and the NS2, NS1, and NS0 bits of the next state signal NS. For a given line in the table, NS represents the next state that will be generated when the signals PS(2:0), CSBS, LR/W*, EQ, MODE, and PENDING having the values indicated for the line. For a particular line, an entry of "1" under a signal name indicates that the signal has a logic high value, an entry of "0" indicates that the signal name has a logic low value, and an entry of "X" indicates that the signal can be either high or low. Also recall from the discussion related to FIG. 3, for the EQ signal to have a value of "1", the value of the transferred TR/W* signal must match the value of the latched LR/W* signal in addition to each bit of the transferred address signal TADDRESS matching each corresponding bit in the latched address signal LADDRESS.

Lines 1-4 represent state 0, or the initial condition state, generated by state machine 190. This is the operating state in which the bus interface starts before every host initiated read or write cycle. It is also the operating state into which the bus interface 10 moves when completing a write access to peripheral 14.

Line 1 indicates that when the the bus interface 10 is in state 0 (i.e., the present state signal PS(2:0)=000), it will continue to operate in state 0 until selected for a data access (i.e., the value of the generated next state signal is NS(2:0)=000, until CSBS is driven low by a chip select).

Line 2 indicates that when the bus interface is selected (CSBS=0), if there is a previous access pending (i.e., PENDING=1), the chip select will be ignored and the bus interface will continue to operate in state 0 (i.e., NS(2:0)=000).

Line 3 indicates that when bus interface 10 is selected for a host microprocessor write (LR/W*=0), if there is no previous access pending (i.e., PENDING=0), the bus interface will move to operating state 5 (i.e., NS(2:0)=101), which is the high byte access state, where data is latched into the data register 54.

Line 4 indicates that when the bus interface is selected for a host microprocessor read, if there is no previous access pending, the bus interface will move to operating state 3, which is the data fetch wait state, to fetch data from the requested location, and latch the data into data register 54, so it can be driven onto the external data bus 30 at a later time.

Lines 5-10 represent state 5, or the high byte access state generated by state machine 190. This is the operating state in which the bus interface 10 latches the high byte of data into data latch 56, during a host microprocessor write; or drives out the high byte of data from data latch 56, during a host microprocessor read.

Line 5 indicates that in the synchronous mode (i.e., MODE=0), if the bus interface 10 is unselected after reaching state 5, it assumes the access was an error, since all accesses must be double byte, and returns to state 0. This is an error condition and returning to state 0 avoids the transfer of potentially invalid data.

Line 6 indicates that in the synchronous mode, if the host microprocessor 12 has not changed the address (i.e., EQ=1) after the high byte access, the bus interface will move to operating state 2, which is the low byte access state.

Line 7 indicates that in the synchronous mode, during the high byte access, if the host microprocessor 12 changes the address or the type of access (i.e., EQ =0) and the access is a host microprocessor write (i.e., LR/W*=0), the bus interface 10 assumes the previous access was an error, and stays in state 5 to latch in the high byte of the new access. This is an error condition.

Line 8 indicates that in the synchronous mode, during the high byte access, if the host microprocessor 12 changes the address or the type of access, and the access is a host microprocessor read (i.e., LR/W*=1), the bus interface 10 assumes the previous access was an error, and will move to state 3 to begin a new data fetch. This is also an error condition.

Line 9 indicates that in the asynchronous mode, during the high byte access, once the host microprocessor has acknowledged the bus interface's DSACK* signal by clearing chip select (i.e., CSBS=1), the bus interface will move to state 4, the between access wait state, to wait for the host microprocessor 12 to request/drive the low byte of data.

Line 10 indicates that in the asynchronous mode (i.e., MODE=1), during the high byte access, the bus interface 10 will wait in state 5 until the host microprocessor 12 acknowledges the bus interface's DSACK* output signal by clearing the chip select signal.

Lines 11-15 represent state 2, or the low byte access state generated by state machine 190. This is the state in which the bus interface 10 latches in the low byte of data during a host microprocessor 12 write, or drives out the low byte of data during a host microprocessor read.

Line 11 indicates that when the host microprocessor clears chip select during the low byte access, the bus interface 10 assumes the access is complete, and moves to state 0, the initial state. If the previous access was a host microprocessor 12 read, the bus interface is ready for the next access. If the previous access was a host microprocessor 12 write, the bus interface will now write the data to the addressed peripheral memory location.

Line 12 indicates that in the synchronous mode, the bus interface 10 will wait in state 2 until the host microprocessor 12 clears chip select. This is an error condition.

Line 13 indicates that in the synchronous mode, if the host microprocessor 12 changes the address or the type of access, and the access is a host microprocessor 12 write, and no previous access is pending, the bus interface 10 will move directly into state 5, the high byte access, and latch the data from the new access.

Line 14 indicates that in the synchronous mode, if the host microprocessor 12 changes the address or the type of access, and the access is a host microprocessor 12 read, and no previous access is pending, the bus interface 10 will move to operating state 3, to begin a new data fetch.

Line 15 indicates that in the asynchronous mode, the bus interface 10 will remain in state 2 until the host microprocessor 12 clears chip select, at which time the bus interface 10 will move to state 0.

Lines 16–22 represent state 3, or the data fetch wait state. When a host microprocessor 12 read is initiated, the bus interface 10 moves to this state while it is fetching the data from the requested peripheral memory location.

Line 16 indicates that in the synchronous mode, during a host microprocessor 12 read, once the bus interface 10 has completed its data fetch, it will wait in state 3 until the host microprocessor 12 drives chip select low.

Line 17 indicates that in the synchronous mode, during a host microprocessor read, if chip select is driven low while the data fetch is still pending, the bus interface will remain in state 3 until the data fetch is complete. This is an error condition.

Line 18 indicates that in the synchronous mode, during a host microprocessor read, if chip select is driven low after the data fetch is complete, and the address has not changed, the bus interface moves to state 5 and drives the high byte of data to the external bus 30 from the data latch 56.

Line 19 indicates that in the synchronous mode, during a host microprocessor 12 read, if the host microprocessor 12 drives chip select low after the data fetch is complete, and LR/W* signal has changed from a read to a write, the bus interface assumes the previous access was an error, and moves to state 5 to latch the new data. This is an error condition.

Line 20 indicates that in the synchronous mode, during a host microprocessor read, if chip select is driven low after the data fetch is complete, and the address has changed, the bus interface assumes the previous access was an error, and moves to state 3 to begin a new data fetch. This is an error condition.

Line 21 indicates that in the asynchronous mode, the bus interface 10 will remain in state 3 and not drive the DSACK* signal low until the data fetch is complete.

Line 22 indicates that in the asynchronous mode, the bus interface 10 will move to state 5 once the data fetch is complete.

Lines 23–26 represent state 4, the access wait state into which the bus interface moves between the high byte access and the low byte access in the asynchronous mode.

Line 23 indicates that the bus interface 10 will remain or wait in state 4 as long as chip select remains high.

Line 24 indicates that when the host microprocessor 12 drives chip select low, if the address has not changed, the bus interface will move to state 2 for the low byte access.

Line 25 indicates that when the host microprocessor 12 drives chip select low, if the address or the type of access has changed, and the access is a host microprocessor write, the bus interface 10 assumes the previous access was an error, and moves into state 5, to latch the new data. This is an error condition.

Line 26 indicates that when the host microprocessor 12 drives chip select low, if the address or the type of access has changed, and the access is a host microprocessor 12 read, the bus interface 10 assumes the previous access was an error, and moves into state 3, to begin a new data fetch. This is an error condition.

It will be understood that bus interface 10 can function without the error avoidance transitions described above, provided that the host microprocessor 12 does not send erroneous signals to the bus interface 10 or violate between-access delay timing. The error conditions and error avoidance transitions are included within state machine 190 to avoid the transmission of possible corrupted data under the defined error conditions.

Figure 6:
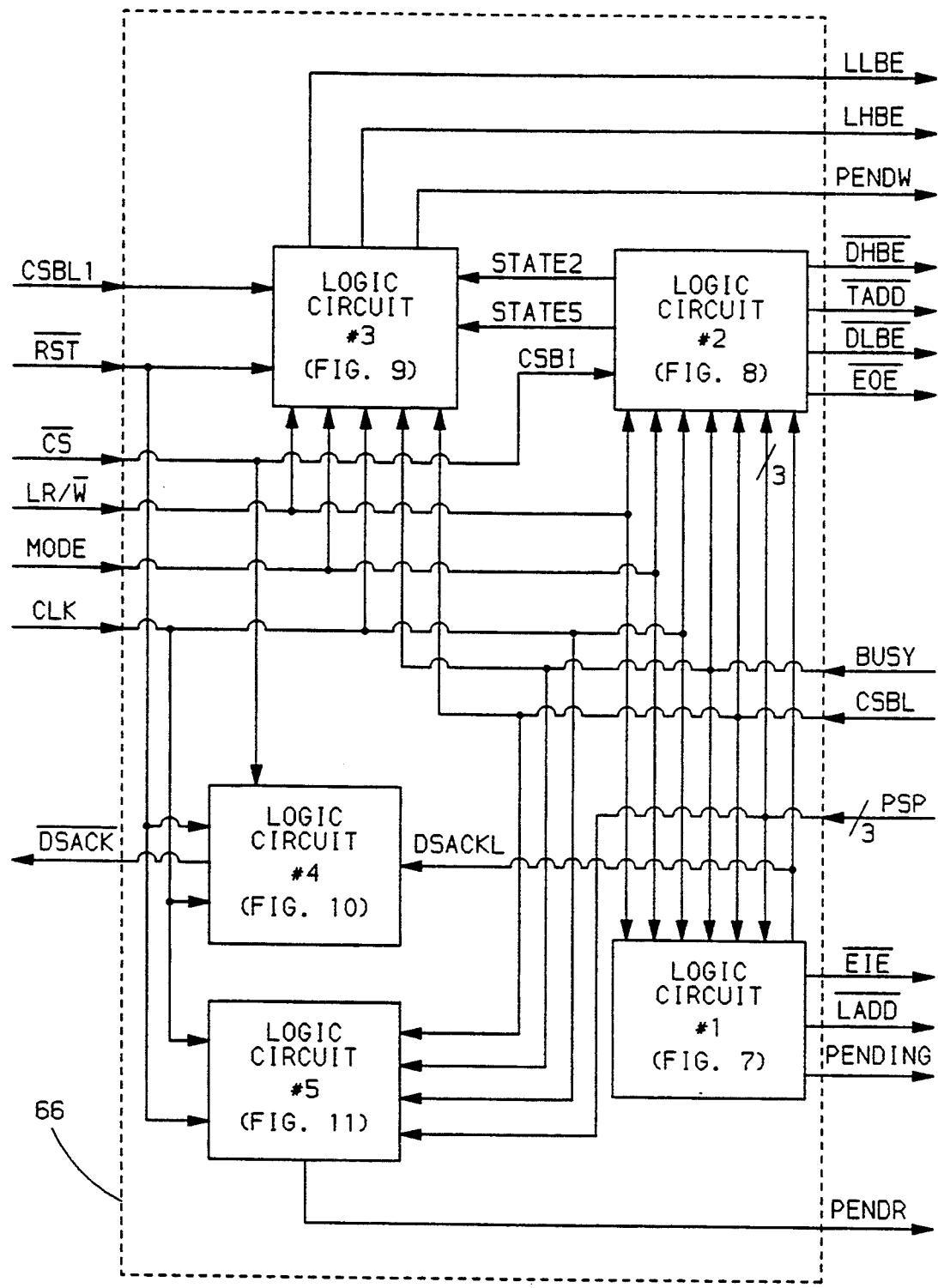
FIG. 6 is a connection diagram illustrating the coupling between a set of individual logic circuits employed in implementing the control logic block of FIG. 2 for the preferred embodiment of the present invention.

Referring now to FIG. 6, there is shown a connection diagram illustrating the coupling between a set of individual logic circuits employed in implementing the control logic block 66 in the preferred embodiment of the invention shown in FIG. 2. These individual logic circuits are designated as logic circuit #1, logic circuit #2, logic circuit #3, logic circuit #4, and logic circuit #5, where logic diagrams for each of these circuits are respectively shown in the parenthetically indicated FIGS. 7, 8, 9, 10, and 11. FIG. 6 is furnished only to point out the signal flow paths between the individual logic circuits, and the input and output lines of the control logic block 66.

Turning now to the individual logic diagrams presented in FIGS. 7, 8, 9, 10, and 11, a brief functional description or overview of the operation of logic circuits #1, #2, #3, #4, and #5 will now be given. Those skilled in the art will recognize that the logic diagrams in FIGS. 7–11 represent only one of many possible implementations for performing functions required of the logic control block 66.

Figure 7:
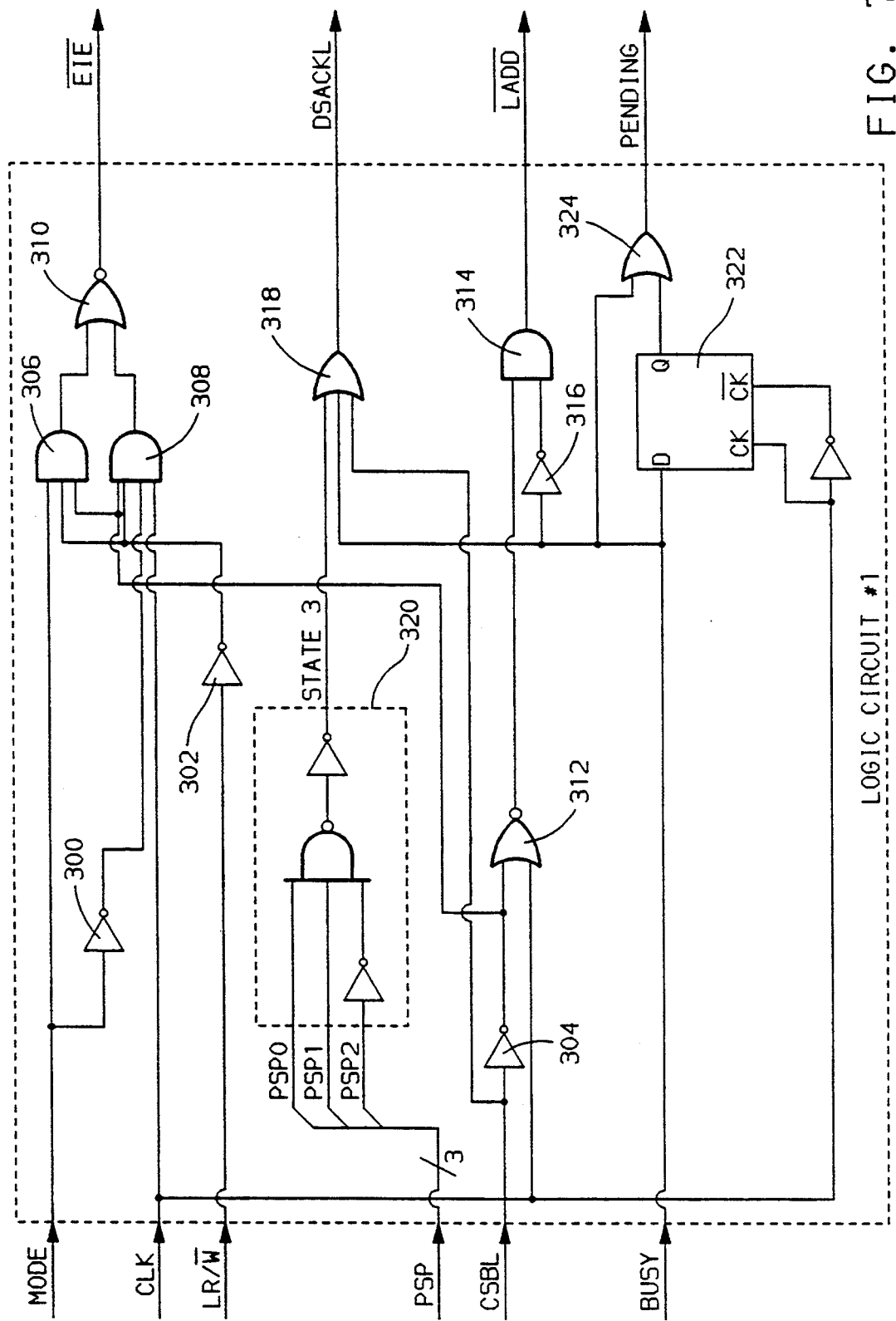
FIGS. 7, 8, 9, 10, and 11 respectively illustrate logic diagrams for each of the logic circuits #1, #2, #3, #4, and #5 shown in the connection diagram of FIG. 6.

FIG. 7 presents the logic diagram for logic circuit #1, which generates output signals EIE*, LADD*, PENDING, and DSACKL, based upon the input signals LR/W*, MODE, CLK, BUSY, CSBL, and the 3 bits of the present state control signal PSP.

Recall from the discussion associated with FIG. 2 that driving the EIE* signal low enables the external bus driver 62 to permit the transfer of data from the host microprocessor 12 to the interface data register 54 during host initiated write operations. In the synchronous mode (MODE=0), during a host request for a write data access (LR/W*=0), EIE* is driven low when the CLK has a logic high value and CSBL has a logic low value. In the asynchronous mode (MODE=1), during a host request for a write data access, EIE* is driven low when CSBL has a logic low value, independent of the logic state of the clock signal CLK. This is accomplished by the interaction of inverters 300 and 302, AND gates 306 and 308, and NOR gate 310.

The DSACKL signal produced by logic circuit #1 is an internal bus interface signal used as an input to both logic circuits #2 and #4 (see FIG. 6). DSACKL is the signal from which the bus interface 10 derives its DSACK* output signal for asynchronous mode operation. Recall that DSACK* is the data strobe acknowledge signal, which is initially at a logic high value, and is driven low to notify the host microprocessor 12 that the bus interface 10 has driven data onto the external data bus 30 (during a read access) or has latched data from the external data bus 30 (during a write access). DSACKL is produced at the output of OR gate 318 in response to the gate input signals CSBL, BUSY, and STATE3. The STATE3 signal has an active high value only when the bus interface is operating in state 3 and is produced as a decode of the PSP signal by the decoder circuit 320. As a result, DSACKL assumes a logic high value, when bus interface 10 is either operating in state 3, or CSBL has a logic high value, or BUSY has a logic high value (indicating that an access to peripheral memory is pending).

The LADD* output signal, when driven low, latches the 9 bit ADDRESS signal and the status of the R/W* signal from the host microprocessor 12 into address register 52. Through the interaction of the inverters 304 and 316, NOR gate 312, and the AND gate 314, the LADD* signal will follow the CLK* signal (the inversion of the CLK clock signal) to enable latching of the ADDRESS and R/W* signal in address register 52, when BUSY has a logic low value, and CSBL has a logic high value.

The PENDING output signal generated by logic circuit #1 provides an indication that a peripheral data access operation is pending whenever it assumes a logic high value. As indicated, the BUSY signal is latched at the Q output of data latch 322 on falling edge of the CLK signal. PENDING is produced at the output of OR gate 324, which has as inputs the BUSY signal and the latched version of the BUSY signal appearing at the Q output of latch 322. In this way, the PENDING signal is immediately driven to a logic high value when BUSY assumes a logic high value, but PENDING is not driven to a logic low value until the occurrence of the first rising edge of the CLK signal after BUSY assumes a logic low value (i.e. the falling edge of pending is synchronized with the rising edge of the CLK signal).

The BUSY signal provided by the peripheral device 14 was described earlier as being driven high immediately in response to either of the interface PENDR or PENDW signals being driven high. In those applications where there is a significant time delay between the PENDR or PENDW signal being driven high by the interface and the BUSY signal being driven high by the peripheral, proper operation of the interface 10 can be assured by adding a three input OR gate to the circuitry of logic circuit #1, and then OR together the entering BUSY signal with the PENDW and PENDR signals generated respectively by logic circuits #3 and #5. The output from the added OR gate can then be used in place of the BUSY signal as an input for the OR gate 318, the OR gate 324, the inverter 316, and the D input of the latch 322. It will be recognized that output from the OR will then act as a new BUSY signal that is driven high immediately when either PENDR or PENDW is driven high.

Figure 8:
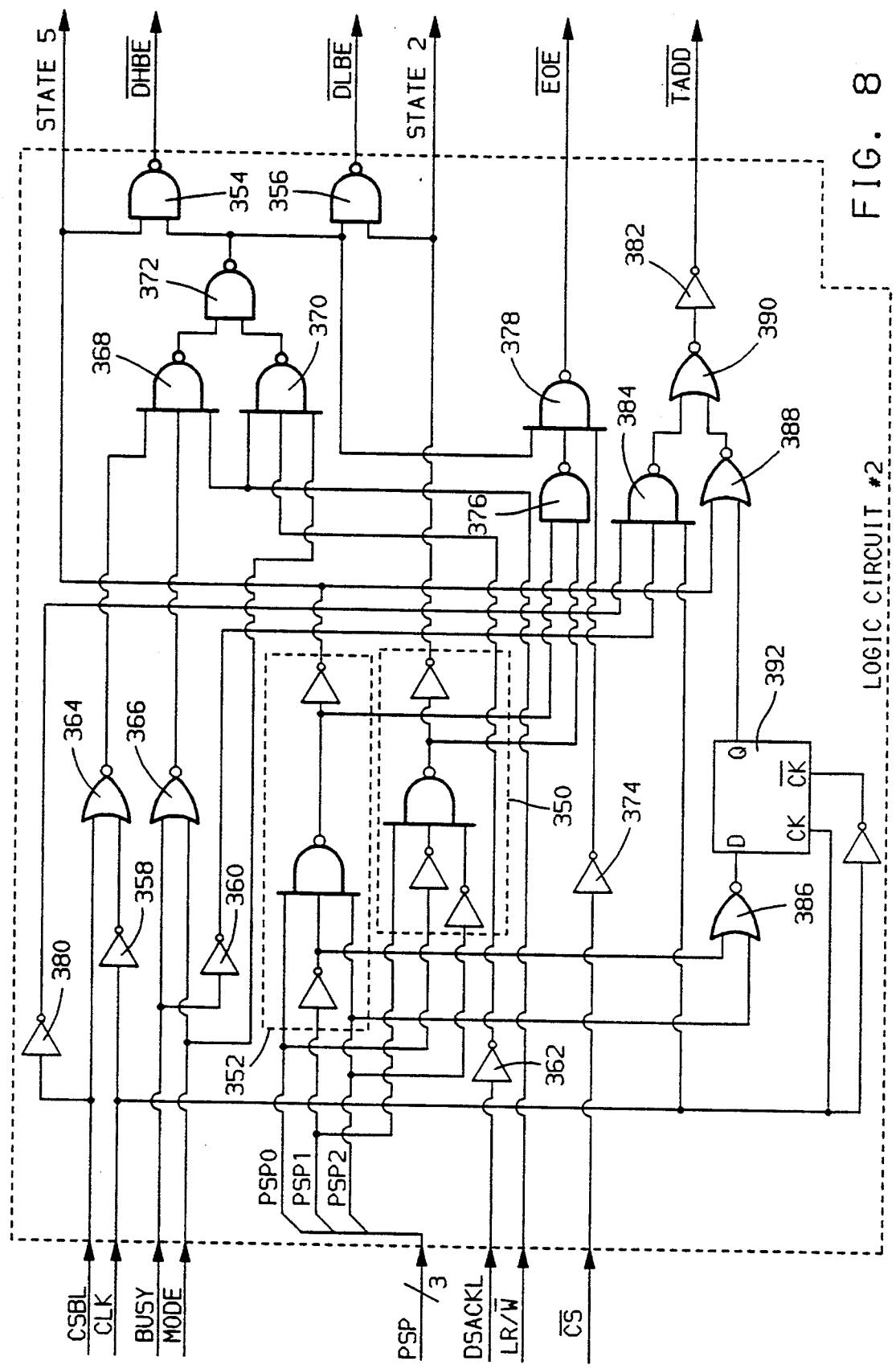

FIG. 8 presents the logic diagram for logic circuit #2, which generates output signals STATE2, STATE5, DHBE*, DLBE*, EOE*, and TADD*, based upon the inputs signals CSBL, CLK, BUSY, MODE, DSACKL, LR/W*, CS*, and the 3 bits of the present state control signal PSP.

The output signal STATE2 is produced by decoder circuit 350 and has a logic high value, only when the present state control signal PSP has a bit pattern equal to 010, which indicates that the bus interface 10 is operating in state 2 (the low byte access state).

The output signal STATE5 produced by decoder circuit 352 has a logic high value, only when PSP has a bit pattern equal to 101, indicating that the bus interface 10 is operating in state 5 (the high byte access state).

Recall from the discussion related to FIG. 2, that the signals DHBE* and DLBE* are driven low to enable external bus drivers within the high and low byte data latches 56 and 58, respectively, so that latched data can be driven onto the external bus 30 during host initiated read access operations. NAND gates 354 and 356 permit DHBE* and DLBE* to be driven low only when the bus interface 10 is operating in state 5 and state 2, respectively. In the synchronous mode (MODE=0), logic circuitry within logic circuit #2 comprising inverters 358 and 362; NOR gates 364 and 366; and the NAND gates 368, 370, and 372, permits the signals DHBE* and DLBE* to be driven low on the rising edges of the CLK signal, when CSBL is low, LR/W* is high, and BUSY is set at its logic low value indicating that a peripheral memory access is not pending. This same logic circuitry prevents DHBE* and DLBE* from being driven low if DSACKL has a logic high value and the interface is being operated in the asynchronous mode (MODE=1).

Recall also from the discussion associated with FIG. 2, that the EOE* signal is driven low to enable the external bus driver 60 when transferring data from register 54 to the host microprocessor 12, during host initiated read access operations. The EOE* signal is produced by circuitry, which includes inverter 374, and NAND gates 376 and 378. The EOE* signal is driven low, whenever the chip select input signal CS* is low, and either the DHBE* signal or the DLBE* signal is set to a logic low value. The inverted CS* from the output of inverter 374 is included as an input to NAND gate 378 to quickly disable bus driver 60 (drive EOE* high) at the end of a host initiated read access (i.e., when host microprocessor 12 drives CS* high).

The TADD* signal is applied to address register 52 to latch and store values of the 9 latched address bits LADDRESS and the latched LR/W* signal in the transfer register within address register 52 (transferred values are latched on the rising edge of the TADD* signal). The TADD* signal is driven low when CSBL is low, CLK is high, BUSY is low, and the bus interface 10 is operating in either state 2, state 3, or state 5. This is accomplished by the interaction of inverters 360, 380, and 382; NAND gate 384; NOR gates 386, 388, and 390; and bistable latch 392.

It will be recognized that the output of NOR gate 386 will have a logic high value only when the bus interface is operating in either state 2 or state 3. The output of NOR 386 is then latched by bistable data latch 392 on the falling edge of the CLK clock signal. The Q output of latch 392 is then applied as one of of the inputs to NOR gate 388, with the other input being the STATE5 signal. Consequently, the output of NOR gate 388, as well as the TADD* signal, can be driven high only when the bus interface 10 operates in state 2, state 3, or state 5, with the CSBL signal having a logic low value and CLK signal having a logic high level.

Figure 9:
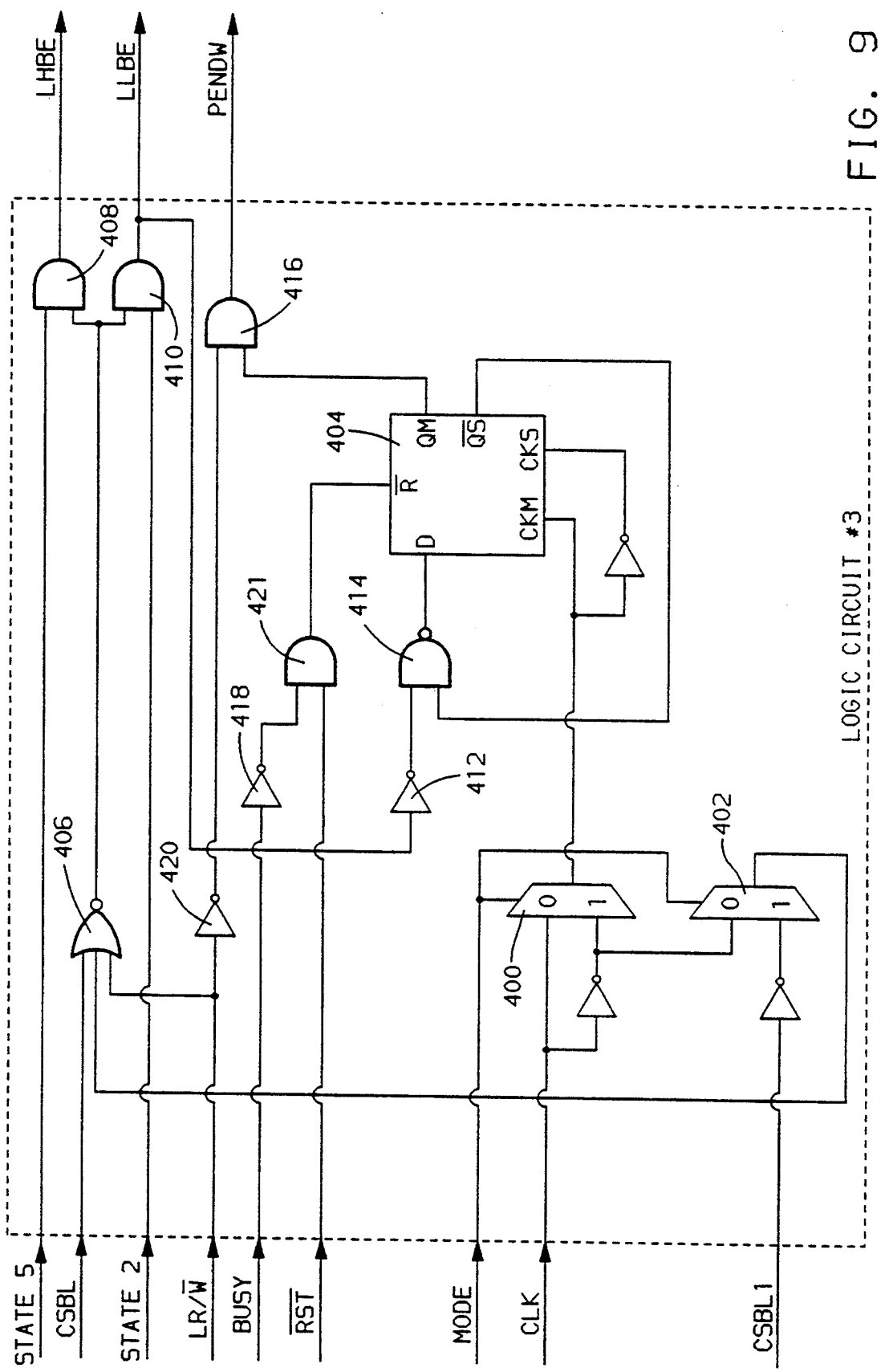

FIG. 9 presents the logic diagram for logic circuit #3, which generates output signals LLBE, LHBE, and PENDW based upon the input signals STATE5, CSBL, STATE2, LR/W*, BUSY, RST*, MODE, CLK, and CSBL1.

Recall from the discussion related to FIG. 2, that the output signals LHBE and LLBE are respectively directed to the high byte and low byte data latches 56 and 58, and are respectively used for first latching a high data byte and then latching a low byte of data from the external data bus 30, during a write access initiated by the host microprocessor 12. After both the high and low bytes have been latched in data latches 56 and 58 within data register 54, the output signal PENDW is driven high to notify the peripheral device 14 that bus interface 10 is ready to write data via the peripheral data bus 32 (i.e., a peripheral write access is pending). The peripheral device 14 then acknowledges this write request by driving its output BUSY signal high. Logic circuit #3 uses the high BUSY signal to reset its PENDW output signal to a logic low value.

Note that the MODE input signal is directed to the select lines of multiplexers 400 and 402. As a result, when the bus interface is operating in the synchronous mode (MODE=0), the CLK signal is passed through multiplexer 400 to the clock input CKM of flip-flop 404, and the inverted clock signal CLK* is passed through multiplexer 402 and becomes one of the inputs to NOR gate 406. Due to the interaction of the NOR gate 406 and the AND gates 408 and 410, the LHBE signal is driven high when the clock CLK is high, LR/W* is low, CSBL is low, and the interface 10 is operating in state 5 (i.e., the STATE5 signal is high). The LLBE signal is driven high under the same conditions, except that interface 10 must be operating in state 2 instead of state 5 (i.e., the STATE2 signal is high). Through the interaction of inverter 412, NAND gate 414, and flip-flop 404, the low to high transition of the LLBE signal is latched at the QS output of flip-flop 404 on the falling edge of the CLK clock signal. The PENDW signal is then generated at the output of AND gate 416 when LR/W* is low (due the presence of inverter 420) and the QS output of flip-flop 404 is high (on the falling edge of CLK, after the LLBE signal goes high). Latch 404 is employed to maintain PENDW high after the LLBE signal is reset to its logic low value. Note that the PENDW signal is reset to its logic low value when the peripheral 14 drives the BUSY signal high, since the BUSY signal is inverted (by inverter 418) and then applied (through AND gate 421) to the reset R* of flip-flop 404.

In the asynchronous mode, the inverted clock signal CLK* is passed through multiplexer 400 to the clock input CKM of flip-flop 404, while the inverted CSBL1 signal is passed through multiplexer 402 as an input for the NOR gate 406. In this mode, flip-flop 404 is clocked with CLK* at its CKM clock input to synchronize the driving high of PENDW with the LLBE signal returning to its logic low value, since the flip-flop 230 that produces CSBL1 (see FIG. 4B) is also clocked by CLK* at its CKM clock input. Note that in the asynchronous mode, the LHBE and LLBE signals are driven high to open their respective data latches 56 and 58 (see FIG. 2), when CSBL goes low. The LHBE and LLBE signals are then driven low to latch data into their respective data latches 56 and 58, when CSBL1 goes low, one CLK clock period later. This provides a three clock period delay between the time that CS* is driven low by the host microprocessor 12 and the time that bus interface 10 latches data placed on the external data bus 30 by the host microprocessor 12. Providing the delay was found to be necessary in the particular application for which the preferred embodiment of the invention was applied (i.e., for interfacing a Motorola MC 68332 host microprocessor using asynchronous bus control), to assure that the microprocessor has sufficient time to place valid data on the external data bus 30.

Figure 10:
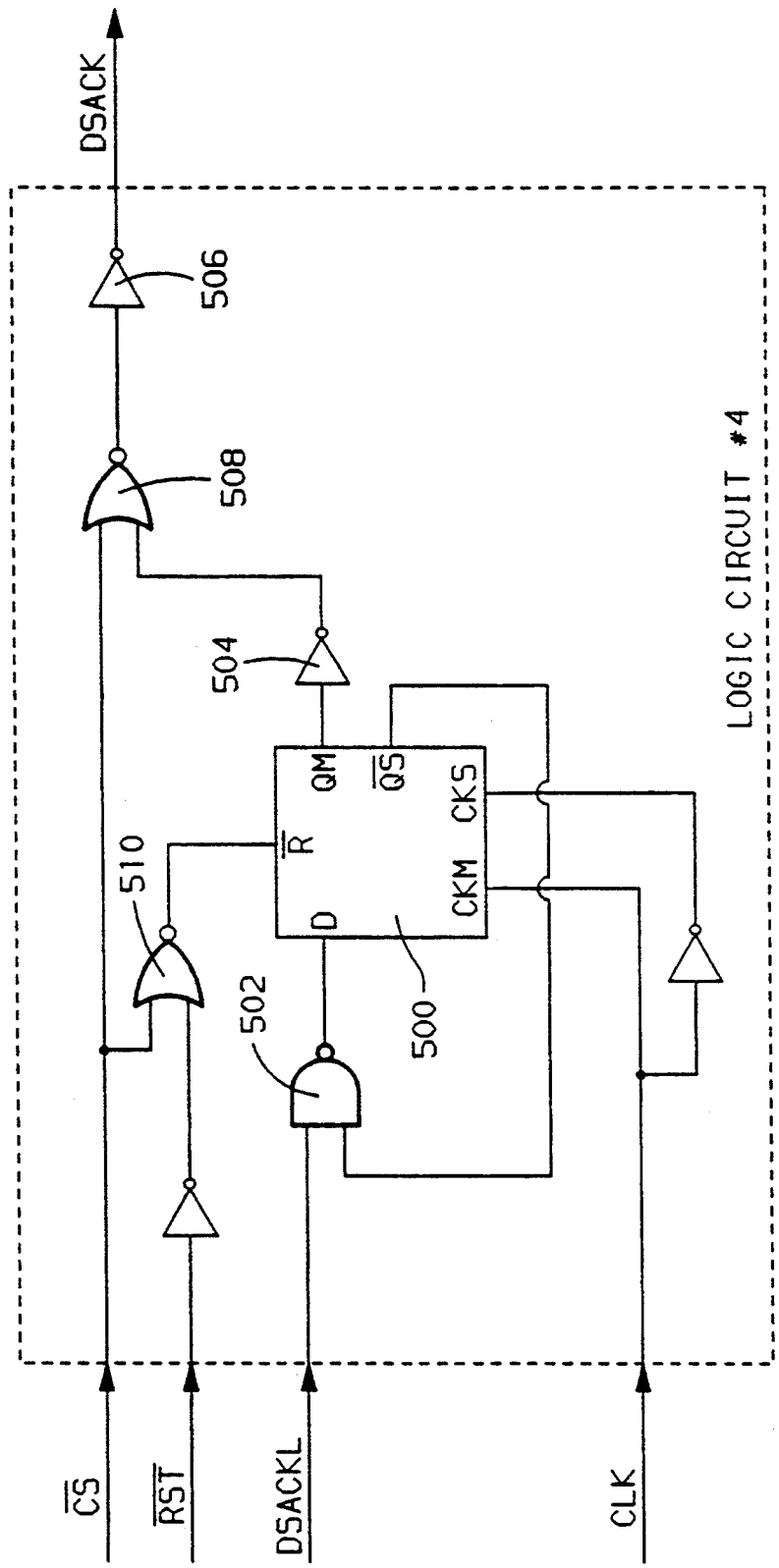

FIG. 10 presents the logic diagram for logic circuit #4, which generates the output DSACK* signal based upon the input signals DSACKL, CS*, RST*, and CLK.

Recall from the previous discussion related to FIG. 7 that the DSACKL signal produced by logic circuit #1 is driven high, whenever the bus interface 10 is operating in state 3, or CSBL has a logic high value, or BUSY has a logic high value (indicating that a read or write access to peripheral memory is pending). The DSACK* signal is a data strobe acknowledge signal derived from DSACKL that is driven low by the bus interface 10 to notify the host microprocessor 12 that data has been driven onto the external bus 30 during a read access, or that data has been latched from the external bus during a write access.

Due to the interaction of flip-flop 500 and NAND gate 502, a transition in the DSACKL signal from a low to high logic value will appear at the QM output of flip-flop 500 on the occurrence of the first rising edge of the CLK clock signal after the low to high DSACKL transition, with the high value being latched at the QM output on the next falling edge of CLK. Inverters 504 and 506 along with NOR gate 508 operate on the CS* input signal and the signal appearing at the QM output of flip-flop 500 to generate the DSACK* output signal. The CS* signal is also passed through NOR gate 510 and is applied to the R* input of flip-flop 500. As a result, the DSACK* signal is driven from a high to low value, on the first rising edge of the clock CLK signal after DSACKL is driven from a low to high value. DSACK* remains at the logic low value until the host microprocessor drives the chip select CS* signal high, which immediately resets flip-flop 500 and drives the DSACK* signal to a logic high value.

Figure 11:
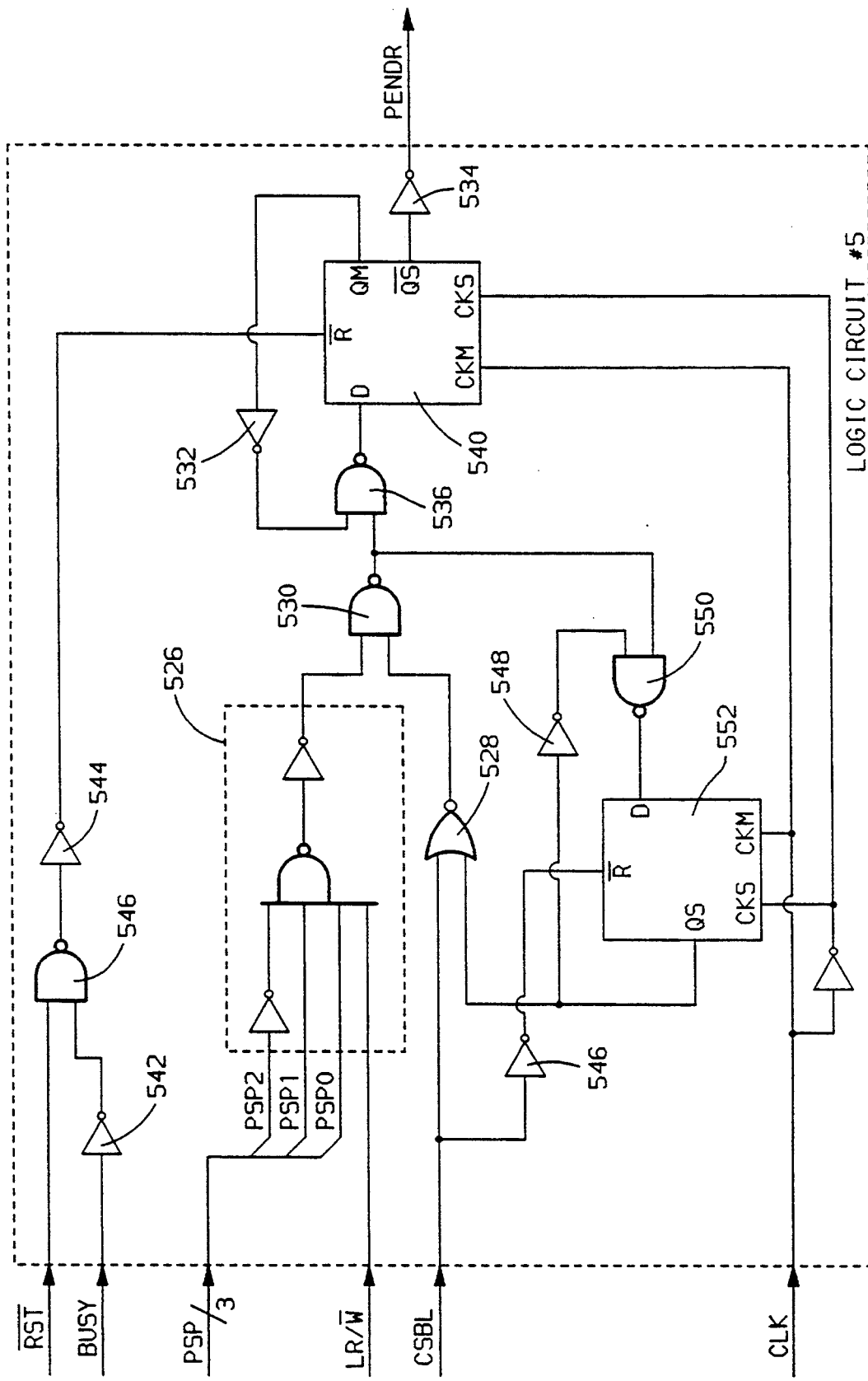
Figure 12:
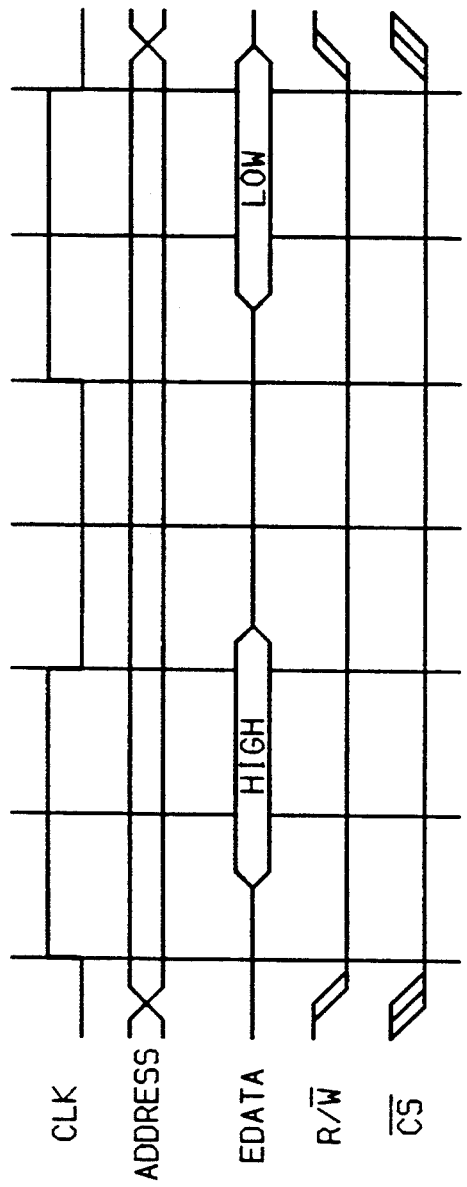
FIG. 12 is a timing diagram related to the operation of the preferred embodiment of the invention during a write access request from a host microprocessor having synchronous bus control.
Figure 13:
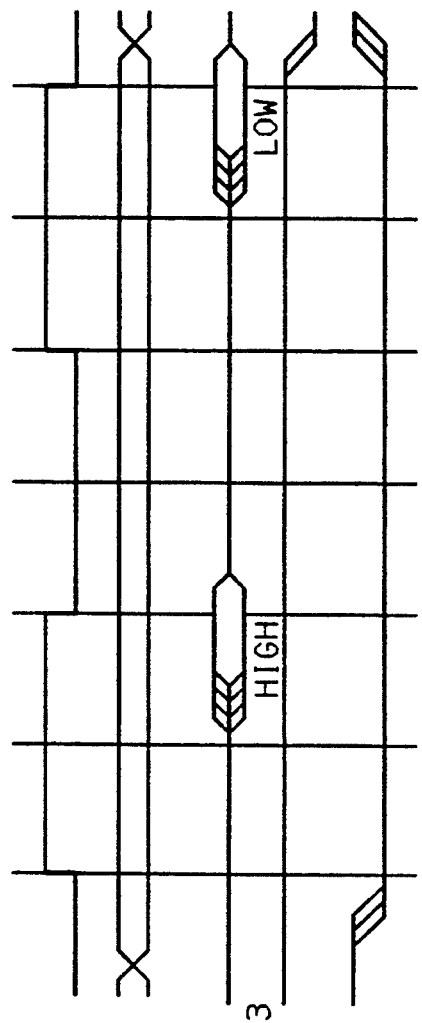
FIG. 13 is a timing diagram related to the operation of the preferred embodiment of the invention during a read access request from a host microprocessor having synchronous bus control.

FIG. 11 presents the logic diagram for logic circuit #5, which generates the output PENDR based upon the input signals RST*, BUSY, PSP, LR/W*, CSBL, and CLK.

Recall from the discussion related to FIG. 2, that the output PENDR signal is sent to the peripheral device 14 by the bus interface 10 to indicate that a read access is in progress or is pending, and that the bus interface 10 is ready to receive data on the internal data bus 32.

Due to the operation of the logic decoder 526 and NOR gate 528, the output of NAND gate 530 will have a logic low value when bus interface is operating in state 3 (i.e., PSP has bit values of 011), LR/W* has a logic high value indicating that a read access has been requested, and CSBL has a logic low value indicating that the peripheral has been selected for an access. Through the interaction of inverters 532 and 534, NAND gate 536 and flip-flop 540, the PENDR signal, which is initially at a low logic value, will be driven high on the first falling edge of the CLK signal that occurs after the output of NAND gate 530 goes low. Due to the latching action of flip-flop 540, PENDR will remain at its logic high value, until the peripheral acknowledges the read request by driving the BUSY signal high, which resets flip-flop 540 through the NAND gate 546 and inverters 542 and 544, and in turn drives the PENDR signal to a logic low value.

In the synchronous mode of operation, CSBL remains at its low value for only one clock period, so the output of NAND gate 530 will be be driven high before the BUSY signal returns to its logic low value, and PENDR will not be erroneously reset to a logic high value (i.e., after the read requested data has been transferred from the peripheral memory location to the data storage register 54). However, when the bus interface is operating in the asynchronous mode, CSBL remains at its logic low value until the end of the data transfer, which will generally be several clock periods after the BUSY signal returns to its low logic value. As a consequence, PENDR will be erroneously reset to a logic high value on the next falling edge of the CLK signal, after the BUSY signal resets flip-flop 540 and then returns to a logic low value.

Inverters 546 and 548, NAND gate 550, NOR gate 528, and flip-flop 552 were included in logic circuit #5 to avoid driving driving PENDR high erroneously when the bus interface operates in the asynchronous mode. When the output of NAND gate 530 is initially driven to a logic high value (by CSBL being driven low), the D input of flip-flop 552 also goes high due to the presence of NAND gate 550. On the first falling edge of the CLK signal that occurs after the D input of flip-flop 552 goes high, its QS output goes high and is latched. The output of NAND gate 530 is then set back to a low value, even though CSBL remains at a logic low value, because the output of NOR gate 528 is driven low due to the logic high signal from the QS output of flip-flop 552. As a consequence, the output of NAND gate 530 will only remain at a logic high value for only one clock period to prevent the erroneous resetting of the PENDR signal to a high value. When the CSBL signal eventually returns to its logic high value, flip-flop 552 is reset due to the presence of inverter 546, so that logic circuit #5 can again recognize when the CSBL signal is driven to a logic low value.

The normal (error free) operation of the bus interface 10 in its synchronous and asynchronous modes will now be described for read and write access requests from host microprocessor 12. To facilitate understanding, reference can be made to FIGS. 12-15, which respectively illustrate timing diagrams for the signals passing between the host microprocessor 12 and the bus interface 10 during a synchronous write access, a synchronous read access, an asynchronous write access, and an asynchronous read access.

SYNCHRONOUS WRITE ACCESS

When the host microprocessor 12 uses synchronous bus control, the MODE signal is set to a logic low value (i.e., MODE=0) to operate the bus interface in the synchronous mode. The host microprocessor 12 requests write access to an addressable memory location within peripheral device 14 by placing the ADDRESS of that location on the address bus 16, driving the R/W* signal to a logic low value, and driving the chip select signal CS* to a logic low value, prior to the rising edge of a CLK clock signal (see FIG. 12). During the period of time prior to the rising edge of the CLK signal, the bus interface will be operating in its initial state 0, and the state machine 190 will generate the next state signal NS (state 5), based on the new values assumed by its input signals CSBS and LR/W*, which are both at logic low levels due to the host driving CS* and R/W* low. On the rising edge of CLK, the high to low transition in CS* is latched as CSBL, the values of the ADDRESS and R/W* signals are latched respectively to become the values of LADDRESS and LR/W* signals, and also the values for the TADDRESS and TR/W* signals. On the same rising edge of CLK, the values of the bits of the NS signal are latched by the state generator logic 64 as the values for the bits for the present state signal PS signal and the present state control signal PSP, thereby moving the operation of the bus interface 10 to state 5. The EIE, signal is also driven low by the high value of the CLK signal to enable the bus driver 62, and the LHBE signal is also driven high, which enables the 8 bits of EDATA placed on the external data bus 30 by the host microprocessor 12 to enter the high byte data latch 56.

On the falling edge of the CLK signal, EIE* is driven high to disable bus driver 62, and LHBE is driven low, thereby latching the 8-bits of EDATA provided by the host microprocessor 12 (HIGH byte in FIG. 12) into the high byte data latch 56. With the CLK signal low, the transferred TADDRESS and TR/W* signals assume the values of the LADDRESS and LR/W* signals, and the bits of the PS signals dynamically follow the values of the bits of the next state signal NS, which will have moved to state 2 during normal operation.

On the rising edge of the next CLK signal, the bit values of the NS signal (state 2) are latched as the bit values for PS and PSP signals, and the interface then operates in state 2. On the same rising edge of the CLK signal, if CS* is low, CSBL remains low and CSBL1 will be driven low. The EIE* signal is again driven low to enable bus driver 62, and the internal interface signal STATE2 will have a logic high value. With the STATE2 signal having a logic high value, the LLBE signal is driven high, which enables the next 8 bits of EDATA (LOW byte) placed on external bus 30 by the host microprocessor 12 to enter the low byte data latch 58.

On the falling edge of the CLK signal, LLBE is driven low, latching the LOW byte of data from data bus 30 in data latch 58. On the same falling edge of the CLK signal, the PENDW signal is driven to its high value and latched, due to LLBE being high prior to the falling edge of the CLK signal. The low to high transition of the PENDW signal indicates to peripheral 14 that data from the host microprocessor 12 has been latched into the interface data register 54, and that the latched data is ready to be transferred to the addressed memory location in the peripheral device 14. Thus, the low to high transition of the PENDW signal initiates data transference between the data storage register 54 and the peripheral device 14.

The peripheral device 14 immediately responds to the low to high transition of the PENDW signal by driving its output BUSY signal high to acknowledge the requested peripheral write access. Also, in response to the PENDW signal being driven high, the peripheral device 14 drives its output DIDATA* signal low in synchronism with its internal peripheral clock, which enables data register 54 to drive the HIGH and LOW bytes of data onto the internal data bus 32. Peripheral device 14 maintains the BUSY signal at a logic high value, until the data on the internal bus 32 has been written into the addressed peripheral memory location. Thus, the logic high value for the BUSY signal indicates that the peripheral 14 is engaged in transferring data between the interface 10 and the addressed peripheral memory location.

The bus interface 10 responds to the driving high of the BUSY signal by immediately driving its internal PENDING signal high as an indication of the pending peripheral memory access, and the PENDW signal is reset to a logic low value.

Once the LOW byte of data has been latched by data latch 58, the host microprocessor 12 would normally drive the chip select signal CS* back to a logic high value. This being the case, the next state signal NS would assume bit values representing state 0, and on the rising edge of the next CLK signal, the interface would move to operating state 0, assuming normal operation.

When the interface is operating in state 0, it ignores any further access requests by the host microprocessor 12 until the internal interface PENDING signal is reset to a logic low value. Recall that PENDING is reset to a low value on the first rising edge of the CLK signal that occurs after the peripheral device has driven its BUSY signal low to indicate that the write to peripheral memory location is complete.

Typically, the host microprocessor 12 would be programmed to wait a predetermined time (number of CLK clock periods) after a write access to a particular peripheral memory location, to allow just the right amount of time to lapse before initiating another read or write access. This wait time can be determined apriori based upon the difference between the clock speeds of the host microprocessor and the peripheral device, and the number of peripheral clock periods required to write the transferred data into the addressed peripheral memory location.

Thus, during an error free synchronous write access, the interface moves from its initial operating state 0, to the high byte access state 5 (see Line 3 in FIG. 5), where the HIGH byte of data is transferred from the host to the interface. From state 5, the interface moves to the low byte access state 2 (see Line 6 in FIG. 5), where the LOW byte of data is transferred from the host to the interface. At this point the interface waits in state 2 until the host drives the chip select signal high, in which case, interface operation moves back to the initial state 0 (see Line 11 in FIG. 5). The interface then waits in state 0, ignoring any further access requests by the host, until the HIGH and LOW bytes of data have been transferred to the addressed peripheral memory location and the PENDING signal is driven low (see Lines 1 and 2 in FIG. 5).

SYNCHRONOUS READ ACCESS

When the host microprocessor 12 uses synchronous bus control, the MODE signal is set to a logic low value (i.e., MODE=0) to operate the bus interface in the synchronous mode. The host microprocessor 12 requests read access to an addressable memory location within peripheral device 14 by placing the ADDRESS of that location on the address bus 16, driving the R/W* signal to a logic high value, and driving the chip select signal CS* to a logic low value, prior to the rising edge of a CLK clock signal (see FIG. 13). During the period of time prior to the rising edge of the CLK signal, the bus interface will be operating in its initial state 0, and the state machine 190 will generate the next state signal NS (state 3), based on the new values assumed by its input signals CSBS (logic low) and LR/W* (logic high), due to the host driving CS* low and R/W* high.

On the rising edge of CLK, the high to low transition in CS* is latched as CSBL, the values of the ADDRESS and R/W* are latched to respectively become the values of LADDRESS and LR/W* signals, and also the values for the TADDRESS and TR/W* signals. On the same rising edge of CLK, the values of the bits of the NS signal are latched by the state generator logic 64 as the values for the bits for the present state signal PS signal and the present state control signal PSP, thereby moving the operation of the bus interface to state 3.

On the same falling edge of the CLK signal, the PENDR signal is driven high and latched, providing notice to the peripheral device 14 that a read access to the addressed peripheral memory location is being requested. The peripheral device 14 immediately responds by driving its BUSY signal high to acknowledge the requested peripheral read access. This low to high transition of the BUSY signal drives the internal interface PENDING signal high, indicating that a peripheral read access is pending. Since the clock signal CLK is low, the bit values of the PS signal will dynamically follow the bit values of the next state signal NS. Thus, the low to high transition of the PENDR signal initiates data transference between the data storage register 54 and the peripheral device 14.

Prior to the rising edge of the next CLK signal, the host microprocessor drives it chip select signal CS* high (which will reset the CSBL signal to a logic high value on the next rising edge of the CLK). This completes what will hereafter be referred to as a "dummy read" by the host microprocessor 12, i.e. no data is actually read by the host since the data on external data bus 30 is not valid (see FIG. 13). However, Since the BUSY signal has a logic high value, the values for LADDRESS and LR/W* remain latched, which assures that the peripheral 14 will receive valid LADDRESS and LR/W* values until it can send data from the addressed memory location to be latched in the interface data register 54. Under these conditions (i.e., PENDING and/or CS* at logic high values) the bus interface waits in operating state 3 on successive CLK clock pulses (see Lines 16 and 17 in FIG. 5).

In addition to driving its BUSY signal high in response to the low to high transition of PENDR, the peripheral device performs the read access at the addressed memory location and places the 16-bits of IDATA on the internal data bus 32, and drives its output LIDATA signal high and then low, in synchronism with the peripheral clock, to latch the HIGH and LOW bytes of the data into data latches 56 and 58. While the BUSY signal is low, the values of the ADDRESS and R/W* signals provided by the host microprocessor 12 will be respectively latched as the values for LADDRESS and LR/W* signals on the rising edge of successive CLK signal, as long as the CSBL signal remains at a logic high level.

After a predetermined number of clock cycles (based upon the known access delay for the addressed peripheral memory location) the host microprocessor 12 again requests a read access by driving the chip select signal CS* low, from the peripheral memory location specified by the ADDRESS signal placed on the address bus 16. It will be recognized that at this time the peripheral access will have been completed and the BUSY signal will have been driven low, which in turn will have driven the PENDING signal to a logic low value. The bits of the NS signal will then take the values representing state 5 (provided that EQ=1).

On the next rising edge of the CLK signal, the value of CSBL is latched and the bit values of the next state signal NS (state 5) are latched as the bit values for the present state signal PS and the present state control signal PSP, so that the operation of the bus interface 10 moves to state 5. On the same rising edge of the CLK signal, the values of ADDRESS and R/W* signals provided by the host will again be respectively latched as the values for the LADDRESS and LR/W* signals, and also the TADDRESS and TR/W* signals. Now, since the STATE5 and LR/W* signals both have logic high values and the CLK is high, the EOE, signal is driven low to enable the bus driver 60 and the DHBE* signal is driven low to drive the HIGH byte data out of data latch 56 onto the external data bus 30. On the falling edge of the CLK signal, EOE* and DHBE are both driven back to high logic values, thereby completing the transfer of the high byte of data to the host microprocessor 12.

On the next rising edge of the clock CLK, the bit values for the next state signal NS become the bit values for the present state signal PSP, during normal operation and the bus interface moves to state 2. With the CLK signal high, EOE* is again driven low to enable bus driver 60 and DLBE* is driven low, thereby driving the LOW BYTE of data from data latch 58 out onto the external data bus 30 to the host microprocessor 12. On the falling edge of the CLK signal, EOE* and DLBE* are both driven back to logic high values to complete the LOW byte transfer.

When the host microprocessor drives the chip select signal CS* high at the end of the read access, the bus interface moves back to the initial state 0 on the next rising edge of the CLK signal.

Thus, during an error free synchronous read access, the host microprocessor performs a dummy read access, which moves the operation of the interface from its initial operating state 0, to the data fetch wait state 3 (see Line 4 in FIG. 5), where the interface waits for data to be fetched from the address memory location in the peripheral device and stored in data register 54 (see Lines 16 and 17). In accordance with the proper protocol, the host microprocessor then drives its chip select signal CS* high to complete the dummy read access. Once the peripheral device has completed the transfer of data to the interface, the PENDING signal is driven low, and the interface then moves to the high byte access operating state (see Line 18 in FIG. 5), where the HIGH data byte is transferred to the host microprocessor. The interface then moves to operate in the low byte access state 2 (see Line 6 in FIG. 5), to transfer the LOW data byte from the interface to the host microprocessor. Finally, the interface moves back to its initial operating state 0, after the host microprocessor drives the chips select signal CS* high.

ASYNCHRONOUS WRITE ACCESS

When the host microprocessor 12 uses asynchronous bus control, data transfers between the bus interface 10 and the host microprocessor 12 generally require a variable number of CLK clock cycles, which is unlike the one data byte per clock period transfers that occur with synchronous bus control. To indicate that the host microprocessor is using asynchronous bus control, the MODE signal is set to a logic high value (i.e., MODE=1), and the bus interface operates in its asynchronous mode. In this mode, the bus interface 10 provides the host microprocessor 12 with a data strobe acknowledge signal denoted as DSACK*, which is driven to a logic low value to notify the host that data has been latched from the external data bus 30, during a host requested write access, or that data has been driven onto the external data bus 30, during a host requested read access.

Figure 14:
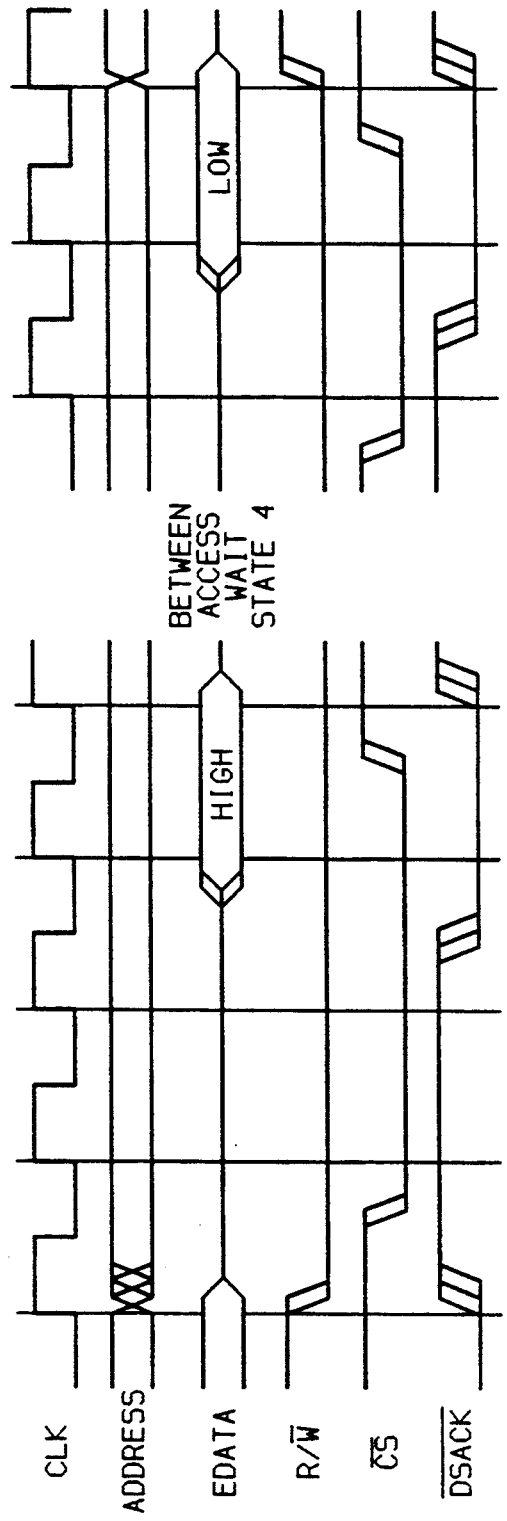
FIG. 14 is a timing diagram related to the operation of the preferred embodiment of the invention during a write access request from a host microprocessor having asynchronous bus control.

To request an asynchronous write access to an addressable peripheral memory location, the host drives the ADDRESS signal representing that location onto the address bus 16, drives the R/W* signal to a logic low value, and drives the CS* signal to a logic low value to select the peripheral device for the access (see FIG. 14). Since this all occurs asynchronously with respect to the host clock CLK, the bus interface latches the high to low transition of the CS* signal on the rising edge of the first CLK signal to form the internal CSBS signal used by the state machine 190. On the later successive rising edges of the CLK signal, the high to low transition of the CSBS signal is latched to drive the CSBL and CSBL1 signals low, just as in the synchronous mode.

On the falling edge of the CSBL signal, the values of the ADDRESS and R/W* signals are respectively latched to become the values for the LADDRESS and LR/W* signals, and also the values for the TADDRESS and TR/W* signals. On the same falling edge of CSBL, the bit values of the NS signal are latched as the bit values for the present state signal PS. The extra delay achieved by latching the CSBS signal on the rising edge of the CLK signal in the asynchronous mode provides sufficient time for the interface to form the next state signal NS (state 5), and for the peripheral device 14 to decode the LADDRESS signal, when the host microprocessor operates at high clock speeds.

With R/W* and CSBS having logic low values, the interface will now be operating in state 5 with the CSBL signal low. The EIE* signal is driven low enabling the bus driver 62, and since the STATE5 signal and the CSBL1 signals are both at logic high values, the LHBE signal is driven high to enable the HIGH byte of data placed on the external bus 30 to enter the high byte data latch 56. The DSACKL signal is also driven low, which in turn drives the bus interface DSACK* output signal low.

On the next rising edge of the CLK signal, CSBL1 is driven low, which forces LHBE low to latch the HIGH data byte in data latch 56. At this point, the bus interface 10 will remain in state 5, until the host microprocessor 12 drives the chip select signal CS* back to a logic high value.

On the rising edge of the CS* signal, the CSBL, CSBL1, DSACKL, and DSACK* signals are all driven high at the same time. The LADDRESS and LR/W* signals now dynamically follow ADDRESS and R/W* signals (when the CLK signal is low). The present state control signal PSP then dynamically follows the next state signal NS (state 4), to change the present operating state of the bus interface to state 4.

The interface will wait in state 4 (the between access wait state) until the host microprocessor 12 again drives the CS* signal low, the bus interface 10 proceeds as before to respectively latch the falling edges of the CSBS, CSBL, and CSBL1 signals on successive rising CLK signal edges. On the fall of the CSBL signal, the bit values for the next state signal NS will be latched in as bit values for the PS signal, and the interface will then operate in state 2 (assuming EQ=1). Also the values for the ADDRESS and R/W* signals will be respectively latched as the values for the LADDRESS and LR/W* signals, and also the TADDRESS and TR/W* signals. The EIE* signal will be driven low to enable bus driver 62, and the STATE2 signal will be driven high. As a result, the LLBE signal is driven high enabling the LOW data byte placed on external bus 30 by the host microprocessor to enter the low byte data latch 58. At the same time, the internal interface DSACKL signal and interface output DSACK* signal are both driven to logic low values.

On the falling edge of the CSBL1 signal (the next rising edge of CLK), the LLBE signal is driven low, which latches the LOW byte of data in the data latch 58. On the same rising edge of the CLK signal that latches the falling edge of CSBL1, the logic high value for the LLBE signal drives the PENDW signal high, which indicates to peripheral device 14 that data is currently in the data register 54 and is ready to be written to the addressed peripheral memory location. The peripheral responds by driving its BUSY signal high and proceeds to write data from data register 54 to the peripheral memory location in the same manner as described previously for the synchronous read access. Recall that the internal interface PENDING signal will be driven to a logic high value while the peripheral is writing the data to its memory location.

When the host microprocessor drives the chip select signal CS* high, the interface signals CSBS, CSBL, CSBL1, DSACKL, and DSACK* signals are all driven to high logic values, and the operation of the bus interface 10 is returned to state 0. The interface will continue to operate in state 0, ignoring any further requested data accesses by the host microprocessor 12, until the peripheral completes writing the data to the addressed peripheral memory location, and then drives its BUSY signal back to a logic low value. Once the BUSY signal is driven low, the internal interface PENDING signal is driven low, and the interface can then again respond to data access requests from the host microprocessor.

Thus, during an error free asynchronous write access the interfaces moves from the initial state 0 to the high byte access state 5 (see Line 3 of FIG. 5), where the HIGH byte of data is transferred to the interface from the host. The interface then drives the DSACK* signal low to acknowledge that the HIGH byte has been latched in the data register 54. The host then drives the chip select CS* signal high. The interface responds by driving the DSACK* signal high, and moves its operation to the between access wait state 4 (see Line 9 in FIG. 5). When the host again drives the chip select signal CS* low, the interface moves its operation to the low byte access state 2, provided the EQ signal has a logic high value (see Line 24 in FIG. 5). While operating in state 2, the host transfers the LOW byte of data to the interface, which responds by driving its DSACK* signal low to acknowledge that the LOW byte has been latched in data register 54. At this point the interface waits in state 2 until the host drives the chip select signal high, which moves the operation back to the initial state 0 (see Lines 11 and 15 in FIG. 5). The interface then waits in state 0, ignoring any further access requests by the host, until the HIGH and LOW bytes of data have been transferred to the addressed peripheral memory location and the PENDING signal is driven low (see Lines 1 and 2 in FIG. 5).

ASYNCHRONOUS READ ACCESS

Figure 15:
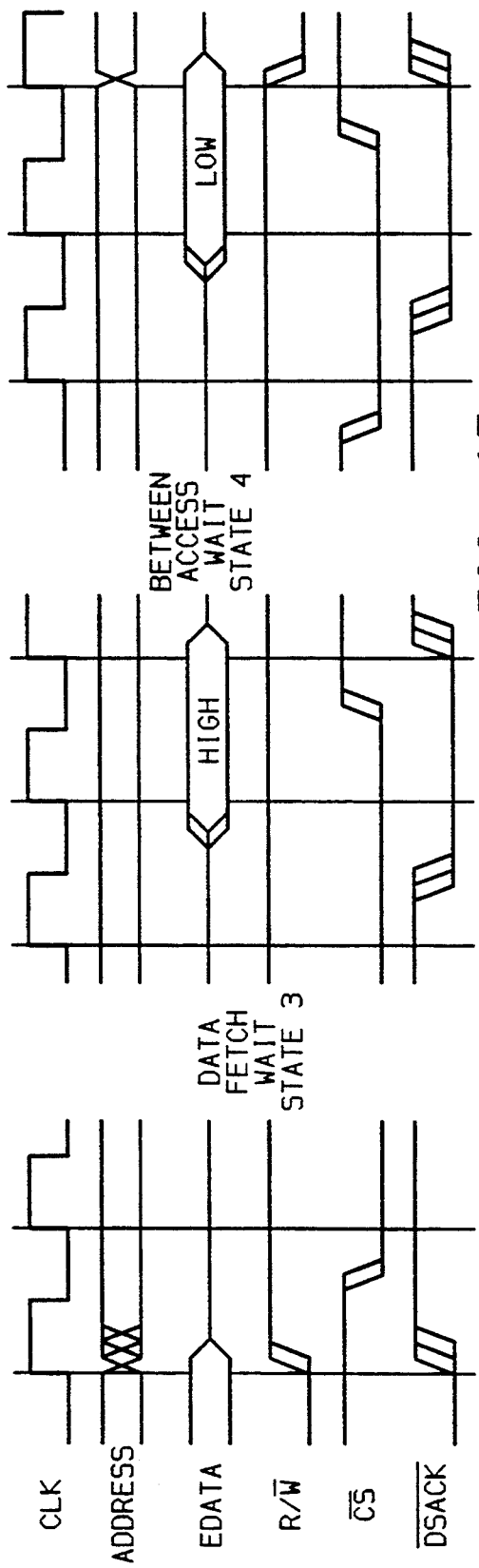
FIG. 15 is a timing diagram related to the operation of the preferred embodiment of the invention during a read access request from a host microprocessor having asynchronous bus control.

In the asynchronous operating mode (MODE=1), the host microprocessor 12 initiates a read access to peripheral memory by driving the ADDRESS signal representing the memory location onto the address bus 16, driving the chip select signal CS* to a logic low value, and driving the read/write request signal R/W* to a logic high value, all asynchronously with respect to the host microprocessor clock signal CLK (see FIG. 15). The internal interface signal CSBS then is driven low on the rising edge of the first CLK signal after the chip select signal CS* is driven low. On the later successive rising edges of the CLK signal, the high to low transition of the CSBS signal is latched to drive the CSBL and CSBL1 signals low, just as in the synchronous mode.

On the falling edge of the CSBL signal, the bit values of the next state signal NS (state 3) are latched as the bit values for the present state signal PS and the present state control signal PSP. On the falling edge of the CSBL signal, the values of the ADDRESS and R/W* signals are latched to respectively become the values for the LADDRESS and LR/W* signals, and also the values for the TADDRESS and TR/W* signals. With the bus interface operating in state 3, the internal STATE3 signal will have a logic high level. Also, the internal DSACKL signal and the interface output DSACK* are driven to logic high levels, indicating to the host microprocessor 12 that the data requested from peripheral memory is not yet ready for the host to read from the external data bus On the next falling edge of the CLK signal, the PENDR signal is driven high to indicate to the peripheral device 14 that a read access of its memory is being requested. The peripheral immediately responds to the low to high transition of the PENDR signal by driving its BUSY signal to a logic high value, while data is being transferred from the addressed memory location to the interface data register 54, in the same fashion as described previously during a synchronous read access. The low to high transition of the BUSY signal resets the interface PENDR signal to a logic low value, and sets the internal interface PENDING signal high on the rising edge of the next CLK signal. As a consequence, the bus interface remains or waits in operating state 3, independent of the number of pulses that occur in the CLK clock signal.

Once the peripheral device 14 has completed the transfer of data from its addressed memory location to the interface data register 54, it drives its BUSY signal low to indicate that the transfer has been completed. On the next rising edge of the CLK signal after the high to low transition of the BUSY signal, the internal interface signal PENDING is reset to a logic low value. At this time, the bits of the present state signal PS and the bits of the present state control signal PSP take on the bit values of the next state signal NS, which moves the bus interface to operate in state 5. Since the bus interface is no longer operating in state 3 and the PENDING signal is at a logic low value, the DSACKL signal and the interface DSACK* signal are driven low to indicate to the host that the requested data for the original read access is now latched in the interface data register 54.

Since the interface is operating in state 5, the internal STATE5 signal will have a logic high value. As a result, the EOE* signal is driven low enabling bus driver 60. Since DSACKL also has a logic low value, the DHBE* signal is driven low, thereby driving the HIGH byte data in data latch 56 out onto the external data bus 30.

The host microprocessor 12 reads the HIGH byte of data from the external bus, and then drives its chip select signal CS* to a logic high value to indicate that it has completed its read of the HIGH byte.

On the rising edge of the CS* signal, the EOE* signal is driven high to disable bus driver 60, and the internal CSBS and CSBL signals, along with the interface output signal DSACK* signal, are all driven to logic high values. In response to the CSBL signal being driven high, the DSACKL signal is also driven high, which in turn forces the DHBE* signal high to disable the high byte data latch 56. With the CS* signal being driven high, the interface moves to operate in state 4 to wait for the next access request from the microprocessor 12. Note that with the CSBL signal at a logic high value, the values of the ADDRESS and R/W* signals are allowed to be latched in as the values for the LADDRESS and LR/W signal on the rising edge of each successive CLK signal as long as CSBL remains high.

When the host microprocessor is ready to read the LOW byte of data latched in data latch 58, it drives the chip select signal CS* to a logic low value. On the rising edge of the next CLK signal after the high to low transition of the CS* signal, the CSBS signal is driven low, and the operation of the bus interface moves to state 2 (provided that EQ=1), and the internal STATE2 signal is driven to a logic high value. This drives the EOE* signal low, enabling bus driver 60, and the DLBE* signal is driven low to drive the LOW byte of data from data latch 58 onto the data bus 30. At the same time, the internal DSACKL signal and the output DSACK* signals are driven to logic low values, thereby notifying the host microprocessor that the LOW byte of data is ready to be read from the external data bus 30.

After the host microprocessor 12 reads the LOW byte for the external data bus 30, it drives the chip select signal CS* high. The rising edge of CS* drives the EOE* and the DLBE* signals high to disable bus driver 60 and the low byte data latch 58. The rising edge of the CS* signal also drives the interface output DSACK* signals high, and moves the operation of the bus interface to state 0, where it remains ready to accept the next data access request from the host microprocessor.

Thus, during an error free asynchronous read access, the interface moves from its initial operating state 0, to the data fetch wait state 3 (see Line 4 in FIG. 5), where the interface waits for data to be fetched from the address memory location in the peripheral device and stored in data register 54 (see Line 21 in FIG. 5). Since the interface is operating in state 3, the DSACK* signal remains high to notify the host that the interface is waiting for data from the peripheral memory to be transferred to its data register 54. Once peripheral device completes the transfer of data to the interface, the PENDING signal is driven low, the operation of the interface is moved to the high byte access state 5 (see Line 22 in FIG. 5). In state 5, the HIGH byte of data is driven on the external bus 30, and the DSACK* signal is driven low to notify the host that the HIGH byte of data is available on the external bus for reading. The host reads the data and then drives its chip select signal CS* high to notify the interface that the HIGH byte has been transferred. The interface drives the DSACK* signal high to acknowledge the notice provided by the host, and then moves to operate in the between access wait state 4 (see Line 9). The host then drives its chip select signal low when it is ready to read the LOW byte, and the interface responds by driving the DSACK* signal low and moving to the low byte access state 2 (see Line 24 in FIG. 5). In state 2, the LOW byte of data is driven onto the external bus 30 and the DSACK* signal is driven low to notify the host. The host then reads the LOW byte and notifies the interface that the data has been transferred by driving its chip select signal CS* high. The interface then moves to operate in its initial state 0.

In summary, the above described embodiment provides a bus interface which is capable of transferring data between a microprocessor that can operate using either synchronous or asynchronous bus control, and a peripheral device having a clock that does not have to be synchronized with the microprocessor clock and one or more memory units requiring different access times. Based upon the mode of operation (synchronous or asynchronous), access request signals provided by the host microprocessor (CS*, R/W*, and ADDRESS), the clock signal CLK provided by the host microprocessor 12, and the engagement signal (BUSY signal) indicating that the peripheral device 14 is engaged in transferring data between the data storage register 54 and the addressed peripheral memory location (BUSY signal), the state machine 190 operates the interface in successive operating states to control the timing of data transference between the host microprocessor and the interface, and the interface and the peripheral device.

When the interface operates in the synchronous mode, data transfers (byte transfers) between the interface and the host microprocessor are accomplished in one host microprocessor clock cycle. During data transference between the interface and peripheral device, the interface waits in established operating states to accommodate peripherals using clocks that are not synchronized to the host clock and having memory units with different access times.

When operating in the asynchronous mode, the interface also waits in operating states to accommodate data transfers between the host microprocessor and the interface that may require a variable number of host microprocessor clock cycles to complete (between access wait state 4). In addition, the interface notifies the host microprocessor when a data transfer between the interface and peripheral device has been completed by the DSACK* signal, which depends upon the BUSY signal, thereby minimizing the number of host microprocessor clock cycles required to complete a data transfer between the host and the peripheral.

In addition, the interface state machine provides for avoiding the transfer of potentially invalid data when certain errors are detected during a data access, by interrupting the transference of data between the microprocessor and the peripheral device. This is accomplished by detecting any change in the address (ADDRESS) and direction of access (R/W*) signals provided by the host microprocessor, between the times that successive data bytes are transferred between the host microprocessor and the bus interface, as determined by the state of the EQ signal. If the ADDRESS or the state of R/W* changes between the high byte access (state 5) and the low byte access (state 2), EQ will not have a value of one and state machine 190 interrupts the transfer of data, assumes that the high byte access was in error, and treats the low byte access as the high byte access for the new address or the new type of access. In the case of synchronous read accesses, the state machine 190 also checks for changes in the ADDRESS and R/W* signals between the initiation of the access by the host, and the time just prior to transferring the HIGH byte of data from the bus interface to the host microprocessor. Those Lines in the state transition table of FIG. 5, where EQ=0 indicate the state transitions that will be made to avoid transmitting invalid data. It will be recognized that the Lines in the state transition table of FIG. 5 having EQ=0 can be removed, and the interface circuit will operate properly under normal conditions, but without the above described error avoidance features.

The combinational logic 200 in the preferred embodiment of the bus interface described above contains all the necessary logic to implement all of the error detection and avoidance transitions of the state table illustrated in FIG. 5. The control logic 66 (FIGS. 7–11) contains the logic for controlling the latching of the LADDRESS, LR/W*, TADDRESS, and TR/W* signals so that the EQ signal can be used for error detection.

In the synchronous mode, the preferred embodiment for the bus interface was intended for use only with Motorola microprocessors from the 6800 family. These microprocessors can not change the values of their ADDRESS or R/W* signals between the HIGH byte and LOW byte accesses on successive cycles of the CLK signal, when using the synchronous bus control. As a consequence, control circuitry for latching LADDRESS and LR/W* and storing TADDRESS and TR/W* during the HIGH byte and LOW byte accesses was not implemented, and EQ was set to a logic high value between these accesses. However, control logic 66 does contain the circuitry for latching and storing the ADDRESS and R/W* signals to detect changes in these signals between the "dummy read" access and the HIGH byte access in the synchronous mode. Thus, the EQ signal is available for use in the synchronous mode to detect an erroneous change in the requested address or type of access between the "dummy read" and the HIGH byte access (see Lines 19 and 20 in FIG. 5).

For other microprocessor applications, those skilled in the art will readily recognize the changes required in the control logic 66 for implementing the latching and storing of the ADDRESS and R/W* signals, so that the EQ signal can be used for detecting changes in the address or type of access between the HIGH byte and LOW byte accesses for synchronous read and write requests.

In the described preferred embodiment of the invention, a data byte contained the customary 8-bits of data. It will be understood that by simply varying the sizes of the external data bus 30, the internal data bus 32, and the data latches in data register 54, the present invention can be used for transferring data bytes having any number of bits per byte, as for example, 16 bit or 32 bit data bytes. Consequently, the number of bits per byte used in describing the preferred embodiment should not be taken to limit the scope of the present invention.

For interfacing microprocessors and peripherals having bus structures with data width ratios other than 1:2, as used in the preferred embodiment, the principles underlying the operation of the bus interface will remain unchanged, but changes would be required in the size and number of data latches 56 and 58 within data register 54, additional control logic 66 would be required for controlling additional data latches added to data register 54, and the number and order of operating states generated by the state generator logic 64 would require modification.

As an example, if the host microprocessor and peripheral device were to use data buses having a data width ratio of N:N, where N represents the number of data bits per byte, then only the one N-bit data latch would be required, say the high byte latch 56 for purpose of illustration. The state machine would also be modified to remove the low byte access state (state 2), and in the asynchronous state, the between access wait state (state 4) would no longer have to be included between high and low byte accesses, since the low byte access would no longer be present.

As a further example, if the host microprocessor and peripheral device were to use data buses having a general data width ratio of N:M*N, where M represents the number of bytes of N-bits each transferred between the host microprocessor and peripheral, then data register 54 would have to include M data latches, each having a size of N-bits, and additional circuitry would be required in the control logic 66 for controlling the additional latches. The state generator 64 would be required to include the following operating states: (1) an idle state, essentially the previously described state 0; (2) a total of M access states for each of the M bytes, which would be similar to states 2 and 5; (3) a data fetch wait state similar to state 3; and (4) a total of M-1 between access wait states similar to state 4, that would be used in between the M access states during operation in the asynchronous mode.

Thus, the aforementioned description of the bus interface circuit is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. An interface circuit for interfacing a peripheral device and a microprocessor to enable data transference between a microprocessor data bus and a memory location within the peripheral device, the interface circuit comprising:

means for selecting an operating mode for the interface circuit, the operating mode being one of a synchronous mode and an asynchronous mode, whereby the interface circuit is operated in a synchronous mode when the microprocessor utilizes synchronous bus control and in an asynchronous mode when the microprocessor utilizes asynchronous bus control;

means for receiving a request for access to a peripheral memory location from the microprocessor;

means for providing the peripheral device with an address specifying the peripheral memory location being requested for access by the microprocessor;

means for receiving a clock signal from the microprocessor;

a temporary data storage register for temporarily storing data receiving from the microprocessor and the peripheral device;

means coupling the microprocessor data bus and the data storage register for data transference between the microprocessor data bus and the interface circuit;

means coupling the peripheral device and the data storage register for data transference between the interface circuit and the peripheral memory location;

means for receiving an indication from the peripheral device indicating that the peripheral device is engaged in transferring data between the data storage register and the peripheral memory location; and control means responsive to the interface operating mode, the clock signal, the request for access from the microprocessor, and the indication of engagement in data transference from the peripheral device, for separately timing and controlling (A) data transference between the microprocessor data bus and the data storage register, and (B) data transference between the data storage register and the peripheral memory location.

2. The interface circuit described in claim 1, wherein the control means further includes:

means for detecting a change in the request for access during data transference between the microprocessor data bus and the peripheral memory location that indicates the occurrence of an error condition; and means for interrupting the transference of data between the microprocessor data bus and the peripheral memory location in response to detecting the occurrence of the error condition to avoid transferring invalid data.

3. An interface circuit for interfacing a peripheral device and a microprocessor to enable data transference between a microprocessor data bus and a memory location within the peripheral device, the interface circuit comprising:

means for selecting an operating mode for the interface circuit, the operating mode being one of a synchronous mode and an asynchronous mode, whereby the interface circuit is operated in a synchronous mode when the microprocessor utilizes synchronous bus control and in an asynchronous mode when the microprocessor utilizes asynchronous bus control;

means for receiving a request from the microprocessor for access to a peripheral memory location, the request including a select signal for selecting the peripheral device for access, an address signal specifying the peripheral memory location, and a read/write signal for indicating whether the request is for a read access or a write access;

means for receiving a clock signal from the microprocessor;

means for latching the address signal and for sending a corresponding latched address signal to the peripheral device;

a temporary data storage register for temporarily storing data received from the microprocessor and the peripheral device;

means for coupling the microprocessor data bus and the temporary data storage register for transferring data between the microprocessor data bus and the temporary data storage register;

means for coupling the peripheral device and the data storage register for transferring data between the data storage register and the peripheral memory location;

means for receiving a busy signal from the peripheral device indicating when the peripheral device is engaged in data transference between the temporary data storage register and the peripheral memory location; and control means responsive to the interface operating mode, the clock signal, the select signal, the read/write signal, and the busy signal for separately timing and controlling (A) data transference between the microprocessor data bus and the temporary data storage register, and (B) data transference between the temporary data storage register and the peripheral memory location.

4. The interface circuit described in claim 3, wherein the control means further includes means for operating the interface in at least one waiting state, wherein any change in the select signal from the microprocessor is disregarded while the peripheral device is engaged in data transference between the peripheral memory location and the temporary data storage register.

5. The interface circuit described in claim 3, wherein the control means further includes means for providing the microprocessor with an acknowledge signal to indicate the enabling of date transference between the microprocessor bus and the temporary data storage register, the acknowledge signal being generated in accordance with the busy signal to indicate disabling of data transference between the microprocessor bus and the temporary data storage register when the peripheral device is engaged in data transference between the temporary data storage register and the peripheral memory location.

6. The interface circuit as defined in claim 3, wherein the control means further includes:

a state machine for operating the interface circuit in successive interface operating states, where the interface operating states define corresponding successive time intervals during the transference of data between the microprocessor data bus and the peripheral memory location; and means responsive to interface operation in defined ones of the successive operating states for generating control signals for separately (A) enabling data transference between the microprocessor data bus and the temporary data storage register, and (B) initiating data transference between the peripheral memory location and the temporary data storage register.

7. The interface circuit as defined in claim 6, wherein the control means includes:

means for directing the temporary data storage register to latch data provided by the microprocessor when the request is for a write access and data transference between the temporary data storage register and the microprocessor data bus is enabled; and means for sending a write initiation signal to the peripheral device after data is latched in the temporary storage register in response to the write access request, to initiate transference of data latched in the temporary data storage register to the peripheral memory location.

8. The interface circuit as defined in claim 6, wherein the control means further includes:

means for sending a read initiation signal to the peripheral device to initiate transference of data from the peripheral memory location to the temporary data storage register in response to a read access request; and means for directing the data storage register to drive temporary data received from the peripheral memory location in response to the read access request, to the microprocessor data bus when data transference between the temporary data storage register and the microprocessor data bus is enabled.

9. An interface circuit for interfacing a peripheral device and a microprocessor to enable data transference between a microprocessor data bus and a memory location within the peripheral device, the interface circuit comprising:
- means for selecting an operating mode for the interface circuit, the operating mode being one of a synchronous mode and an asynchronous mode, whereby the interface circuit is operated in a synchronous mode when the microprocessor utilizes synchronous bus control and in an asynchronous mode when the microprocessor utilizes asynchronous bus control;
- means for receiving a request from the microprocessor for access to a peripheral memory location, the request including a select signal for selecting the peripheral device for access, an address signal specifying the peripheral memory location, and a read/write signal for indicating whether the request is for a read access or a write access;
- means for receiving a clock signal from the microprocessor;
- means for latching the address signal and for sending a corresponding latched address signal to the peripheral device;
- a temporary data storage register for temporarily storing data received from the microprocessor and the peripheral device;
- means coupled the peripheral device and the temporary data storage register for transferring multiple bytes of data in parallel between the temporary data storage register and the peripheral memory location;
- means for coupling the microprocessor data bus and the temporary data storage register for separately transferring single bytes of data between the microprocessor data bus and the temporary data storage register;
- means for receiving a busy signal from the peripheral device indicating when the peripheral device is engaged in transferring multiple bytes of data between the temporary data storage register and the peripheral memory location; and
- control means responsive to the interface operating mode, the clock signal, the select signal, the read/write signal, and the busy signal for separately timing and controlling multiple transference of single byte data between the microprocessor data bus and the temporary data storage register, and multiple byte data transference between the temporary data storage register and the peripheral memory location.

10. The interface circuit as described in claim 9, wherein the control means further includes:
- a state machine responsive to the interface operating mode, the clock signal, the select signal, the read/write signal, and the busy signal for operating the interface circuit in successive interface operating states, where the interface operating states define corresponding sequential time intervals during the transference of data between the microprocessor data bus and the peripheral memory location; and
- means responsive to interface circuit operation in defined ones of the operating states for generating control signals for separately enabling multiple transference of single byte data between the microprocessor data bus and the temporary data storage register and separately initiating multiple byte data transference between the peripheral memory location and the temporary data storage register.

11. The interface circuit described in claim 10, wherein the control means further includes means for providing the microprocessor with an acknowledge signal to indicate the enabling of each single byte data transference between the microprocessor bus and the temporary data storage register, where the acknowledge signal is generated in accordance with the busy signal to indicate disabling of single byte data transference when the peripheral device is engaged in multiple data byte transference between the temporary data storage register and and the peripheral memory location.

12. The interface circuit as described in claim 10, wherein the successive interface operating states include at least one waiting state, wherein any change in the select signal from the microprocessor is disregarded while the peripheral device is engaged in multiple byte data transference between the peripheral memory location and the temporary data storage register.

13. The interface circuit as described in claim 10, wherein the successive interface operating states include multiple, single byte data access states, in which the interface operates to enable corresponding multiple transfers of the single byte data between the microprocessor temporary data bus and the data storage register.

14. The interface circuit as described in claim 10, wherein during interface operation in the asynchronous mode, the successive interface operating states include a between access wait state interposed between each of the single byte data access states, wherein the interface waits for a change in the select signal received from the microprocessor before proceeding to operate in a successive single byte data access state.

15. The interface circuit as described in claim 13, wherein the interface circuit further includes:
- means for detecting any change in the address signal and the read/write signal received from the microprocessor between the enabling of different single byte data transfers between the temporary data storage register and the microprocessor; and the state machine further includes:
- means for interrupting the transference of data between the microprocessor data bus and the temporary data storage register in response to the detection of any change in the address signal and the read/write signal.

* * * * *